US012763329B2

(12) United States Patent
Chung et al.

(10) Patent No.: US 12,763,329 B2
(45) Date of Patent: Oct. 13, 2026

(54) CORE-SHELL CATHODE AND A LITHIUM-SULFUR BATTERY USING THE SAME

(71) Applicant: NATIONAL CHENG KUNG UNIVERSITY, Tainan City (TW)

(72) Inventors: Sheng-Heng Chung, Tainan City (TW); Yun-Chen Wu, Tainan City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 712 days.

(21) Appl. No.: 18/088,069

(22) Filed: Dec. 23, 2022

(65) Prior Publication Data

US 2024/0145706 A1 May 2, 2024

(30) Foreign Application Priority Data

Oct. 31, 2022 (TW) ................................. 111141394

(51) Int. Cl.

*H01M 4/58* (2010.01)
*H01M 4/62* (2006.01)
*H01M 10/052* (2010.01)
*H01M 4/02* (2006.01)

(52) U.S. Cl.

CPC ......... *H01M 4/5815* (2013.01); *H01M 4/625* (2013.01); *H01M 10/052* (2013.01); *H01M 2004/021* (2013.01)

(58) Field of Classification Search

CPC ... H01M 4/5815; H01M 4/625; H01M 10/052
See application file for complete search history.

(56) References Cited

U.S. PATENT DOCUMENTS

2013/0224594 A1* 8/2013 Yushin .................... H01M 4/38 252/182.1
2018/0351166 A1* 12/2018 Chen ..................... C01B 32/174
2019/0115587 A1 4/2019 Manthiram et al.
2024/0105998 A1* 3/2024 Xu ........................ H01M 4/625

FOREIGN PATENT DOCUMENTS

WO WO-2017218150 A1 * 12/2017 ............. H01M 4/38

* cited by examiner

*Primary Examiner* — Barbara L Gilliam
(74) *Attorney, Agent, or Firm* — Sughrue Mion, PLLC

(57) ABSTRACT

The present invention provides a core-shell cathode characterized by comprising: a shell comprising an electrically conductive, porous carbon material; and a core, which is an inner cavity enclosed within the shell, wherein the core contains an active material and an electrolyte, and the active material comprises liquid polysulfide having the general formula $Li_2S_x$, wherein $4 \leq x \leq 8$; the shell comprises a first layer, an O-ring and a second layer sequentially stacked from bottom to top to form the inner cavity to contain the active material and the electrolyte. The present invention also provides a lithium-sulfur battery using said core-shell cathode, which attains both high sulfur loading and high sulfur content, and simultaneously satisfies high energy density, high capacity retention and high cycle stability under lean-electrolyte condition.

8 Claims, 32 Drawing Sheets

CORE-SHELL CATHODE AND A LITHIUM-SULFUR BATTERY USING THE SAME

CROSS-REFERENCE TO RELATED APPLICATIONS

This application claims priority to Taiwan Patent Application No. 111141394, filed on Oct. 31, 2022. The entire content of the application is hereby incorporated by reference.

FIELD OF INVENTION

The present invention relates to a core-shell cathode and a lithium-sulfur battery using the same. More particularly, the present invention relates to a core-shell cathode structure which blocks passage of an active material from the cathode, and a lean-electrolyte lithium-sulfur battery using said core-shell cathode, which attains high sulfur loading, high sulfur content, excellent areal capacity and energy density, and stable long-term cyclability.

BACKGROUND

Nowadays, the development of energy-storage technology aims for high energy density and low production cost. Commercial lithium-ion battery cathodes offer high theoretical capacity of 200-250 mAh/g, and therefore dominate the energy-storage market for over 30 years. However, the mature insertion lithium-ion technology has now encountered challenges, such as the instability of the crystalline structure during cycling, the limited theoretical charge-storage capacity, and increasing high costs.

In order to break through the technological bottleneck in lithium-ion battery technology, various new types of batteries have developed and risen rapidly. Among them, high energy density lithium-sulfur batteries apply the electrochemical theory of conversion battery chemistry. During charge and discharge, per mole of active material, sulfur, involved in the phase transformations of the redox reaction involves two moles of electrons, and thus renders lithium-sulfur batteries having a high theoretical specific capacity of 1,672 mAh/g. Moreover, during phase transformations of charge and discharge, the intermediate product, liquid polysulfides, has strong reactivity with lithium, which can eliminate lithium dendrites and thus ensure the safety of batteries. In addition, sulfur element is abundant and inexpensive, and sulfur-based cathode material does not contain heavy metals. Therefore, sulfur is a low-polluting electrode material that is easily available and environmentally benign.

Despite the abovementioned advantages of lithium-sulfur batteries, during charge and discharge, the cathode active material undergoes multiphase transformations from solid phase to liquid phase and then to solid phase, which result in a huge volume change of 80% and a solid-liquid state electrochemical conversion of active material suffered by the electrode material. In addition, solid-state sulfur and its final reduction product after discharge, solid-state lithium sulfide, have high resistivity of $10^{-30}$ S/cm and $10^{-14}$ S/cm respectively, which causes only a small fraction of the active material simultaneously in contact with the cathode current collector and electrolyte to be electrochemically utilized. Also, the liquid-state polysulfides dissolve easily in the electrolyte, resulting in easy diffusion of the active material, thereby leaving the cathode and eventually causing capacity fade. If the active material diffuses to the Li-metal anode, it undergoes chemical reduction and form solid-state lithium sulfide precipitate on the surface of lithium metal. The Li-metal anode will thus lose its reactivity, thereby causing damage in capacity and charge-discharge reaction capacity. Due to these natures of sulfur cathode materials, current research on lithium-sulfur batteries often encounters challenges such as diffusion and loss of active material, and fast capacity fade.

Furthermore, if conventional electrode manufacturing process is utilized, which uses binders and conductive additives in an aluminum-foil current collector, the co-structure of electrode materials and current collector may gradually collapse after long-term cycling, resulting in a short cycle life. Also, addition of these inactive materials will render the lithium-sulfur batteries to encounter challenges from a material science perspective when attempting to satisfy high energy density requirement.

SUMMARY

Technical Problems to be Solved (1) Challenges in Increasing the Cathode Active Material Loading and Content Conventional lithium-sulfur batteries have a sulfur loading of only 1-2 mg/cm$^2$, and a sulfur content of less than 50 wt % due to large addition of electrical materials and composite materials. Moreover, sulfur and lithium sulfide, as the final products of lithium-sulfur batteries after charge and discharge reaction, both have high resistivity. Therefore, it is difficult to attain excellent theoretical capacity. In practice, it is also difficult to increase active material loading and simultaneously maintain desirable cycling performance.

(2) Complex Composite Cathode/Battery Materials

In order to promote the reactivity of cathode active material, additional conductive or catalytic inactive materials may be added through a complicated manufacturing process. Thus, it is difficult to increase cathode active content, causing the lithium-sulfur batteries to face challenges from a material science perspective when attempting to reach high energy density.

(3) Instability of Current Collector Structure

The active materials of lithium-sulfur battery have a significant volume change of up to 80% during charge and discharge reaction. If the conventional manufacturing process is applied, which uses binders to fix the active materials and conductive additives in aluminium-foil current collector, the co-structure of electrode materials and current collector may gradually collapse after long-term cycling, resulting in a short cycle life.

(4) Diffusion and Loss of Active Materials

During charge and discharge of lithium-sulfur battery, liquid-state polysulfides are formed, which are easily dissolved in liquid electrolytes and thereby escape from the electrodes. It causes irreversible capacity fade during repeated electrochemical reactions, thereby resulting in loss of active materials and rapid decline in electricity.

(5) Challenges in Lowering Electrolyte Content in a Battery

Lowering electrolyte content in a lithium-sulfur battery increases the concentration of polysulfides in the electrolyte, resulting in an increase in the viscosity of the electrolyte. Consequently, the ionic conductivity decreases, thereby leading to increased polarization of the battery. In addition, during the electrochemical reaction, active materials, lithium metal, and many battery components consume the electrolytes. Therefore, the decreased content of the electrolyte lowers the utilization of the active materials, and even leads to precipitations of active martials formed in an inert area, causing increase in impedance in the battery and reduction in capacity. It therefore affects stability of long-term cycling, coulombic efficiency of charge and discharge, and energy density. Also, the performance of the battery significantly declined during charge and discharge at a high rate, and thus loses its applicability. In view of this, addition of large amounts of electrolytes is applied in conventional lithium-sulfur batteries with an electrolyte-to-capacity ratio of over 20 μL/mg. Although high electrolyte content has an advantage of active materials utilization, thereby improving the battery performances in such as capacity, stability and coulombic efficiency during charge and discharge, excessive electrolyte content prevents the lithium-sulfur battery from attaining the required high energy density.

Hence, conventional lithium-sulfur batteries have problems with basic physical properties, for example, the key issues of the insulating nature of sulfur and polysulfide diffusion. Moreover, low sulfur loading, low sulfur content and excessive electrolytes all cause overestimation of the lithium-sulfur battery efficiency, and thus limit its commercial application.

In view of the abovementioned technical problems, the objective of the present invention is to provide a core-shell cathode, as well as synthesis of liquid polysulfides with high reactivity. Electrically conductive, porous carbon material is applied to form a shell, which is then assembled and tightly enclose the active material, sulfur, in a core, to improve reaction kinetics of the sulfur electrode, and eliminate diffusion of liquid polysulfides out from the cathode, thereby attaining high sulfur loading and high sulfur content, as well as excellent electrochemical efficiency and reversibility. Moreover, the present invention also provides a lithium-sulfur battery using said core-shell cathode, which simultaneously attains high energy density, high capacity retention and high cycling stability under lean-electrolyte condition.

Technical Means

In order to achieve the abovementioned objective, the present invention provides the following technical means.

In an aspect, the present invention provides a core-shell cathode, which is characterized by comprising:

- a shell; and
- a core, which is an inner cavity enclosed within the shell, wherein the core contains an active material and an electrolyte, and the active material comprises liquid polysulfide having the general formula $Li_2S_x$, wherein $4 \leq x \leq 8$;
- the shell comprises a first layer, an O-ring and a second layer sequentially stacked from bottom to top to form the inner cavity to contain the active material and the electrolyte.

The core-shell cathode of the present invention is assembled by stacking materials of two shapes, a solid shell and a hollow core, forming a three-dimensional structure with a central cavity. The active materials are enclosed in the central cavity of the core-shell cathode. The core-shell cathode, on a macro-scale, is required to enclose the active materials and function as a current collector as well.

In some embodiments, the shell comprises an electrically conductive, porous carbon material. In some embodiments, the electrically conductive, porous carbon material may be composed of highly conductive carbon fiber substrates or various functional carbon papers and carbon materials, for example, the electrically conductive, porous carbon material may comprise carbon nanofibers and carbon nanotubes, such as single-walled carbon nanotubes, double-walled carbon nanotubes, and multi-walled carbon nanotubes. In some embodiments, the electrically conductive, porous carbon material may include graphene and carbon powders. In some embodiments, the material of the shell includes various solid materials that function as current collectors.

The core-shell cathode of the present invention may function as a carrier for active materials as well as a current collector, thus eliminating the usage of aluminium-foil current collectors, such that the present invention attains high sulfur loading, high sulfur content, high electrochemical utilization, and high efficiency in charge and discharge.

The core-shell cathode of the present invention may effectively trap active materials within the cathode without addition of any binders, such that the present invention attains high sulfur loading, high sulfur content, and the electrochemical performance of cycling stability and rate capacity.

The sulfur loading described in the present invention is defined as total weight (mg) of the active material sulfur added in the battery. Due to electrochemical reaction properties and battery structure, sulfur element is only added in the cathode of a battery, so only the total weight of sulfur in the cathode is calculated. In some embodiments, the core-shell cathode of the present invention has a sulfur loading of at least 4 $mg/cm^2$, preferably at least 5 $mg/cm^2$, more preferably at least 8 $mg/cm^2$, even more preferably at least 10 $mg/cm^2$. In some embodiments, the core-shell cathode of the present invention has a sulfur loading of between 4 $mg/cm^2$ and 30 $mg/cm^2$, preferably between 5 $mg/cm^2$ and 25 $mg/cm^2$, more preferably between 8 $mg/cm^2$ and 25 $mg/cm^2$, more preferably between 8 $mg/cm^2$ and 20 $mg/cm^2$, even more preferably between 10 $mg/cm^2$ and 20 $mg/cm^2$. In some embodiments, the core-shell cathode of the present invention has a sulfur loading of 12 $mg/cm^2$.

In some embodiments, the core-shell cathode of the present invention has a sulfur content of at least 50 wt %, preferably between 50 wt % and 95 wt %, more preferably at least 60 wt %, more preferably between 60 wt % and 85 wt %, even more preferably between 60 wt % and 70 wt %. In some embodiments, the core-shell cathode of the present invention has a sulfur content of 64 wt %.

In some embodiments, the shell of the core-shell cathode of the present invention comprises an electrically conductive, porous carbon material. In some embodiments, the electrically conductive, porous carbon material may be formed from a highly conductive carbon fiber substrate, or may be composed of various functional carbon papers and carbon materials, for example, the electrically conductive, porous carbon material may comprise carbon nanofibers and carbon nanotubes, such as single-walled carbon nanotubes, double-walled carbon nanotubes, and multi-walled carbon nanotubes. In some embodiments, the electrically conductive, porous carbon material may include graphene and carbon powders. In some embodiments, the material of the shell includes various solid materials that function as current collectors.

In some embodiments, the electrically conductive, porous carbon material has a specific surface area of preferably less than 200 $m^2/g$, preferably less than 150 $m^2/g$, more preferably less than 100 $m^2/g$, more preferably between 60 $m^2/g$ and 90 $m^2/g$, even more preferably between 75 $m^2/g$ and 85 $m^2/g$. In some embodiments, the electrically conductive, porous carbon material has a specific surface area of approximately 80 $m^2/g$. In some embodiments, the electrically conductive, porous carbon material has a total pore volume of between 0.3 $cm^3/g$ and 0.55 $cm^3/g$, preferably between 0.3 $cm^3$/g and 0.5 $cm^3$/g, more preferably between 0.35 $cm^3$/g and 0.45 $cm^3$/g, even more preferably approximately 0.4 $cm^3$/g. In some embodiments, the electrically conductive, porous carbon material has an average pore diameter of between 10 nm and 40 nm, preferably between 12 nm and 28 nm, more preferably approximately 20 nm.

In another aspect, the present invention provides a lithium-sulfur battery, which is characterized by comprising: a lithium anode, a separator, the core-shell cathode described herein, and an electrolyte.

The electrolyte-to-sulfur ratio (μL/mg) described in the present invention represents the electrolyte volume provided to active materials for solid-liquid state electrochemical conversion, which is highly correlated to energy density of a battery. The lower the electrolyte-to-sulfur ratio, the higher the energy density of a battery. Said electrolyte volume is defined as the total volume (μL) of electrolyte added in a battery, including the volume of all electrolytes added in the cathode and anode of a battery. So far, most of the research on lithium-sulfur batteries still applies an electrolyte-to-sulfur ratio of greater than 20 μL/mg, or even ignores this parameter. In some embodiments, the lithium-sulfur battery of the present invention has an electrolyte-to-sulfur ratio of less than 20 μL/mg, preferably between 3 μL/mg and 15 μL/mg, more preferably less than 10 μL/mg, more preferably between 3 μL/mg and 10 μL/mg, even more preferably between 3 μL/mg and 7 μL/mg.

In some embodiments, the lithium-sulfur battery of the present invention has an areal capacity of between 5 mAh/$cm^2$ and 20 mAh/$cm^2$, preferably between 5 mAh/$cm^2$ and 12 mAh/$cm^2$, more preferably between 8 mAh/$cm^2$ and 12 mAh/$cm^2$.

In some embodiments, the lithium-sulfur battery of the present invention has an energy density of at least 10 mWh/$cm^2$, preferably at least 15 mWh/$cm^2$, more preferably between 10 mWh/$cm^2$ and 30 mWh/$cm^2$, more preferably between 12 mWh/$cm^2$ and 25 mWh/$cm^2$, even more preferably at least 20 mWh/$cm^2$. In some embodiments, the lithium-sulfur battery of the present invention has an energy density of between 18.1 mWh/$cm^2$ and 20.5 mWh/$cm^2$.

The electrolyte volume described in the present invention is defined as the total volume (μL) of electrolyte added in a battery, including the volume of all electrolytes added in the cathode and anode of a battery. The capacity described in the present invention is defined as the discharge capacity (mAh/g) exhibited by a battery discharged to cut-off voltage after it is fully charged in the previous charge-discharge cycle. The electrolyte-to-capacity ratio (μL/mAh) described in the present invention represents the performance of utilization of the active material sulfur for the electrolyte. This parameter cannot be directly controlled as the electrolyte-to-sulfur ratio, since electrolyte content significantly affects utilization of active materials, thereby influencing the battery capacity. Since electrolyte-to-capacity ratio is related to the weight of inactive materials in a battery and the battery capacity, for a given electrolyte-to-sulfur ratio, the lower the electrolyte-to-capacity ratio, the higher the utilization of active materials in the battery system, showing a higher specific energy. In some embodiments, the lithium-sulfur battery of the present invention has an electrolyte-to-capacity ratio of less than 10 μL/mAh, preferably less than 5 μL/mAh.

In some embodiments, the lithium-sulfur battery of the present invention, after cycling for 100 cycles at a c-rate between 0.10 C and 0.20 C, has a capacity retention of at least 70%, preferably at least 80%. In some embodiments, the lithium-sulfur battery of the present invention has a capacity retention of at least 70% and a coulombic efficiency of higher than 98% after 200 cycles.

In some embodiments, the core-shell cathode of the present invention may simultaneously attain a high sulfur loading of 12 mg/$cm^2$ and a high sulfur content of 64 wt %; also, the lithium-sulfur battery with said core-shell cathode exhibits excellent areal capacity and energy density, respectively approaching 8.7 to 10.2 mAh/$cm^2$, and 18.1 to 20.5 mWh/$cm^2$, under lean-electrolyte condition, for example an electrolyte-to-sulfur ratio of only 3 to 7 μL/mg, and reversibility in long-term cycling of at least 100 cycles, successfully achieving high energy under lean-electrolyte condition for it to be commercially viable.

The macro-scale and micro-scale structural design of the core-shell cathode of the present invention may effectively utilize the electrolytes in the system and greatly reduce electrolyte loss, such that the lithium-sulfur battery of the present invention has a high energy density under lean-electrolyte condition, with outstanding rate capability, cycling stability, electrochemical efficiency, and reversibility.

Technical Effects

The core-shell cathode of the present invention encloses active materials in a central cavity. The core-shell cathode of the present invention traps the active materials and functions as current collectors as well. Without any binders, the core-shell cathode of the present invention attains high sulfur loading and sulfur content, as well as high electrochemical utilization and charge-discharge efficiency, and effectively utilizes electrolytes in the system and reduces electrolyte loss.

The core-shell cathode of the present invention improves the loading and reactivity of the active materials. With high-concentration liquid polysulfides included in catholytes and serving as initial active material, the present invention increases the active material loading. This configuration is also the state with the highest infiltration level between active materials and electrolytes. Due to strong mobility of liquid polysulfide, it flows and diffuses easily when being filled in the core of the core-shell cathode, enabling it to evenly contact with the electrically conductive, porous carbon material of the shell. In addition, the electrochemical reaction in a battery occurs at the current collector/active material/electrolyte interface. Hence, a battery with the catholytes as initial reactant is capable of sufficiently utilizing the active materials filled therein under the condition of high active material loading.

The core-shell cathode of the present invention traps the solid-state and liquid-state active materials within the cathode. The core-shell cathode of the present invention utilizes its physical structure to enclose the active materials in the core with three-dimensional structure on a macro-scale. On a micro-scale, the core-shell cathode of the present invention takes advantage of the strong tortuosity of the electrically conductive, porous carbon material of the shell, for example, intricately arranged and inextricably intertwined carbon nanofibers and carbon nanotubes, such that the highly layered network constructs strongly tortuous channels, deterring the viscous polysulfides migrating out from the shell of the shell of the core-shell cathode. Accordingly, the core-shell cathode of the present invention traps the active materials in the core and within the micro-scale structure of the electrically conductive, porous carbon material the of the shell, deterring active material loss due to its diffusion during reaction.

The core-shell cathode of the present invention increases electrical conductivity of the electrode, such that the active material content and loading is improved. The material of the shell of the core-shell cathode comprises an electrically conductive, porous carbon material. In some embodiments, highly conductive carbon nanotubes and carbon nanofibers are used, and multiple fibers are intertwined to form a network-like conductive carbon skeleton structure. Hence, an effective high-conductivity network is formed, such that the lithium-sulfur battery with the core-shell cathode of the present invention exhibits a low cathode impedance of 60 to 100Ω before cycling.

The core-shell cathode of the present invention effectively improves ionic conductivity of the electrode, which greatly lowers the volume of the electrolytes in the system. In addition, the gaps within the strongly tortuous and inextricably intertwined carbon fiber skeletons of the shell are on the scale of giant pores, which may function as a channel for transporting the lithium ions in the electrolytes, and thus may effectively transmit the lithium ions to the active materials in the core. Moreover, the electrically conductive, porous carbon material of the shell only contains a small number of nano-scale pores, and has a low specific surface area, thereby preventing absorption loss of electrolytes and allowing efficient utilization of electrolytes by the system. Hence, the lithium-sulfur battery of the present invention exhibits stability in charge and discharge cycle with high coulombic efficiency under lean-electrolyte condition with a low electrolyte-to-sulfur ratio of 3 μL/mg to 7 μL/mg. In some embodiments, the lithium-sulfur battery of the present invention has a lithium-ion diffusion coefficients of $2.2\times10^{-7}$ $cm^2/s$ to $6.3\times10^{-8}$ $cm^2/s$.

The core-shell cathode of the present invention attains high energy density, high capacity retention and high cycling stability. In some embodiments, the lithium-sulfur battery with the core-shell cathode of the present invention exhibits high stability in charge and discharge, stability in cycling 200 cycles at a constant rate with high capacity retention of at least 70%, a high coulombic efficiency of greater than 98%, a high areal capacity of 8.7 to 10.2 $mAh/cm^2$, and an energy density of 18.1 to 20.5 $mWh/cm^2$. These electrochemical performances outperform the critical areal capacity required for powering an electric vehicle of 2 to 4 $mAh/cm^2$, and also surpass the conventional commercial oxide electrodes with an energy density of approximately 10.1 $mWh/cm^2$.

BRIEF DESCRIPTION OF THE DRAWINGS

Exemplary embodiments are illustrated in referenced figures. It is intended that the embodiments and figures disclosed herein are to be considered illustrative rather than restrictive.

FIGS. 5A and 5B present the results for the core of the core-shell cathode, and FIG. 5C and FIG. 5D present the results for the shell of the core-shell cathode.

FIG. 6A and FIG. 6B present the results for the core of the core-shell cathode, and FIG. 6C and FIG. 6D present the results for the shell of the core-shell cathode.

FIG. 7A presents the result for the inner surface of the shell, and FIG. 7B presents the result for the outer surface of the shell.

FIGS. 9A, 9B, 9C, 9D, 9E, and 9F present the results for microstructural and elemental analysis at Site A (FIGS. 9A and 9B), Site B (FIGS. 9C and 9D) and Site C (FIGS. 9E and 9F) before cycling. FIGS. 9G, 9H, 9I, 9J, 9K, and 9L present the results for microstructural and elemental analysis at Site A (FIGS. 9G and 9H), Site B (FIGS. 91 and 9J) and Site C (FIGS. 9K and 9L) after cycling.

Figure 17A:
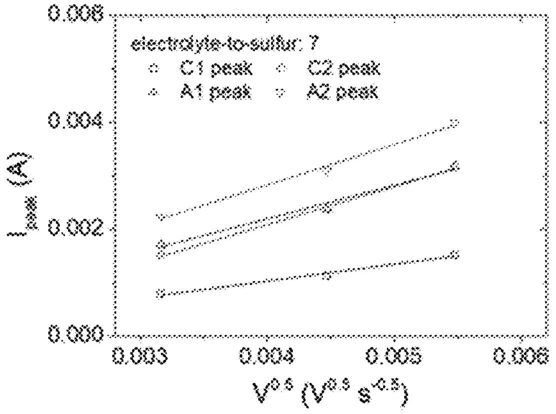
FIGS. 17A, 17B, 17C, and 17D present lithium-ion diffusion coefficients of the lithium-sulfur battery with the core-shell cathode under an electrolyte-to-sulfur ratio of 7
Figure 17B:
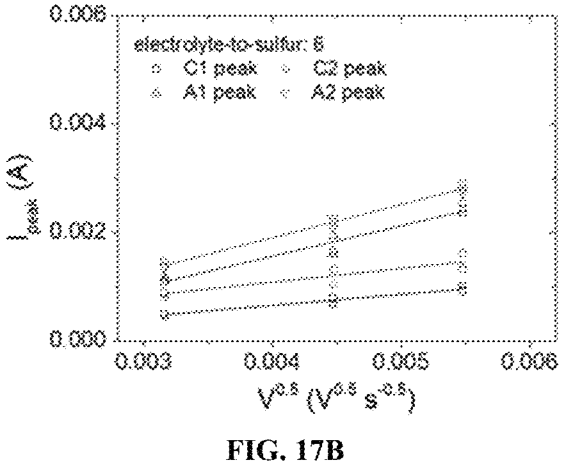
Figure 17C:
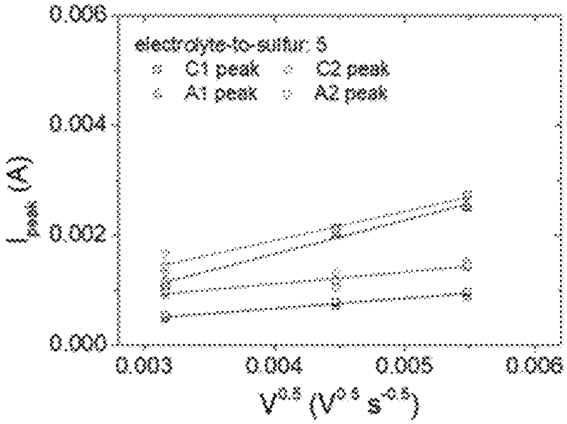
Figure 17D:
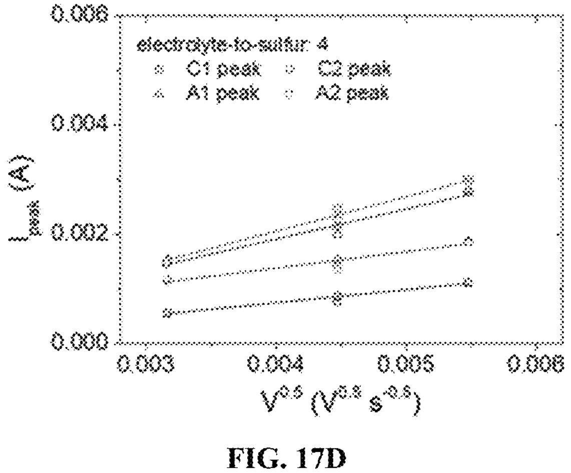

μL/mg (FIG. 17A), 6 μL/mg (FIG. 17B), 5 μL/mg (FIG. 17C), and 4 μL/mg (FIG. 17D).

Figure 18:
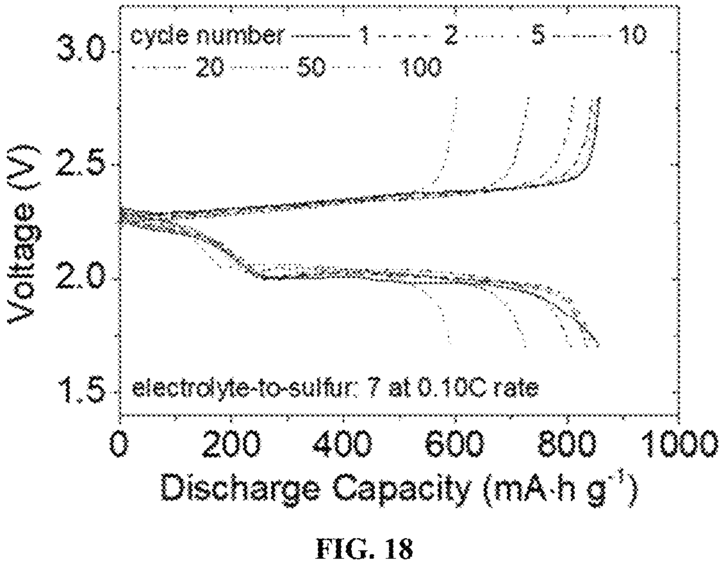

FIG. 18 presents discharge/charge voltage profiles of the lithium-sulfur battery with the core-shell cathode under an electrolyte-to-sulfur ratio of 7 μL/mg at 0.10 C rate for long-term cycling of 100 cycles.

Figure 19A:
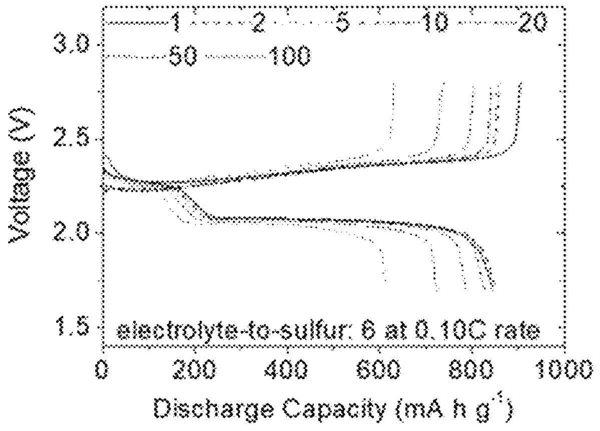
Figure 19B:
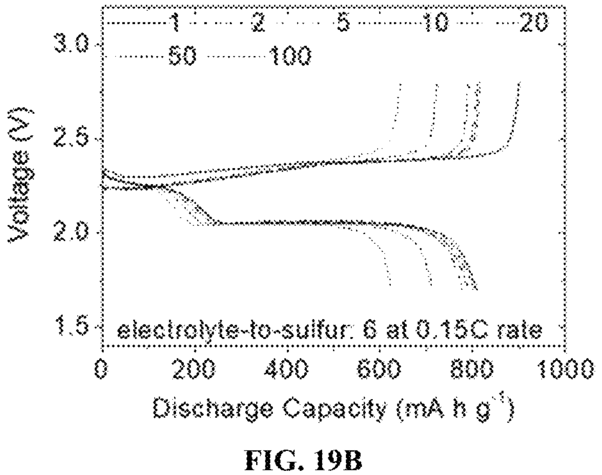
Figure 19C:
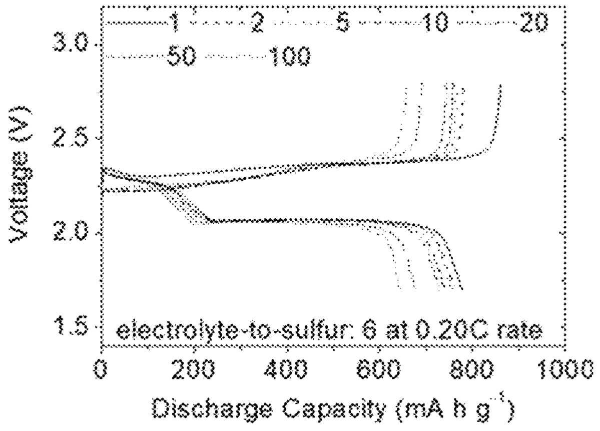

FIGS. 19A, 19B, and 19C present discharge/charge voltage profiles of the lithium-sulfur battery with the core-shell cathode under an electrolyte-to-sulfur ratio of 6 μL/mg at 0.10 C (FIG. 19A), 0.15 C (FIG. 19B), and 0.20 C (FIG. 19C) rates for long-term cycling of 100 cycles.

Figure 20A:
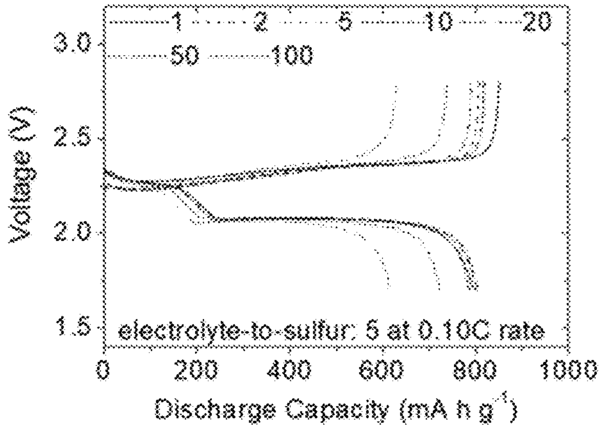
Figure 20B:
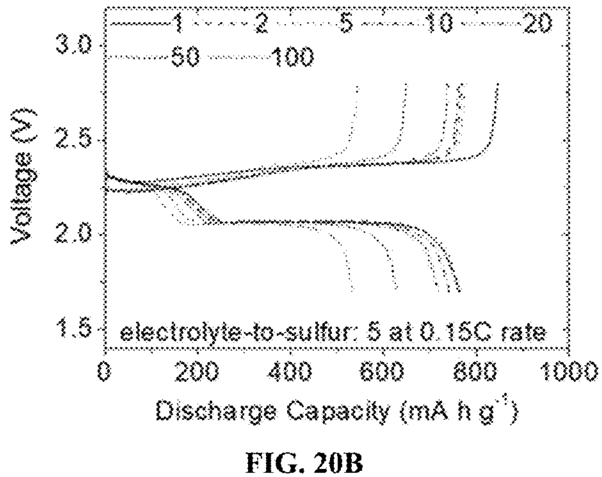
Figure 20C:
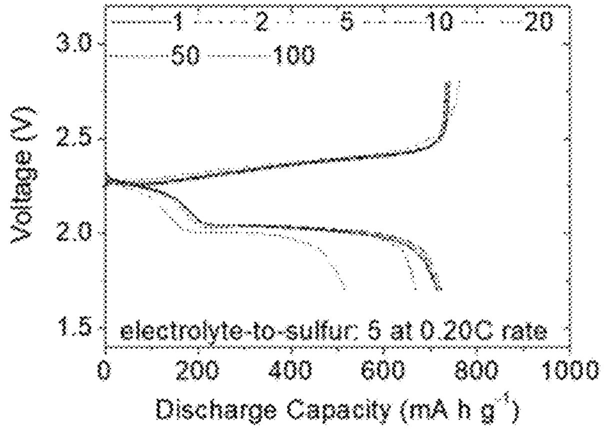

FIGS. 20A, 20B, and 20C present discharge/charge voltage profiles of the lithium-sulfur battery with the core-shell cathode under an electrolyte-to-sulfur ratio of 5 μL/mg at 0.10 C (FIG. 20A), 0.15 C (FIG. 20B), and 0.20 C (FIG. 20C) rates for long-term cycling of 100 cycles.

Figure 21A:
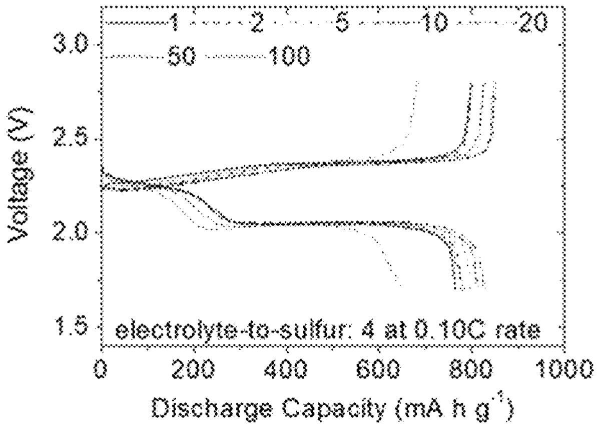
Figure 21B:
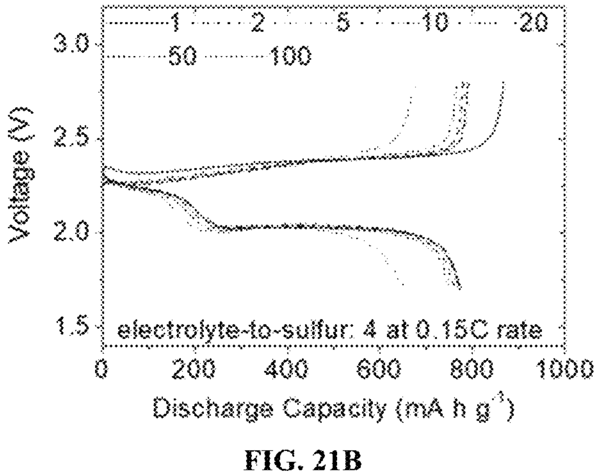
Figure 21C:
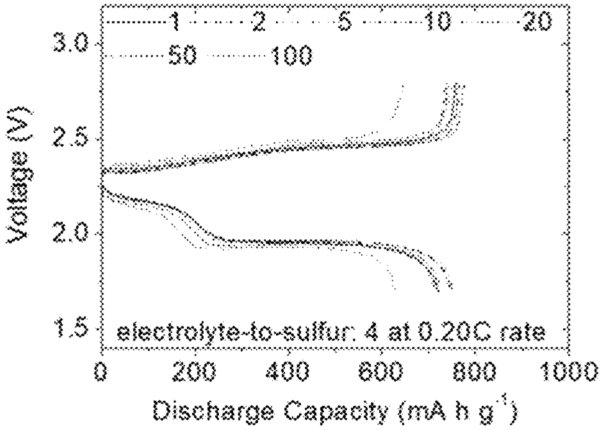

FIGS. 21A, 21B, and 21C present discharge/charge voltage profiles of the lithium-sulfur battery with the core-shell cathode under an electrolyte-to-sulfur ratio of 4 μL/mg at 0.10 C (FIG. 21A), 0.15 C (FIG. 21B), and 0.20 C (FIG. 21C) rates for long-term cycling of 100 cycles.

Figure 22:
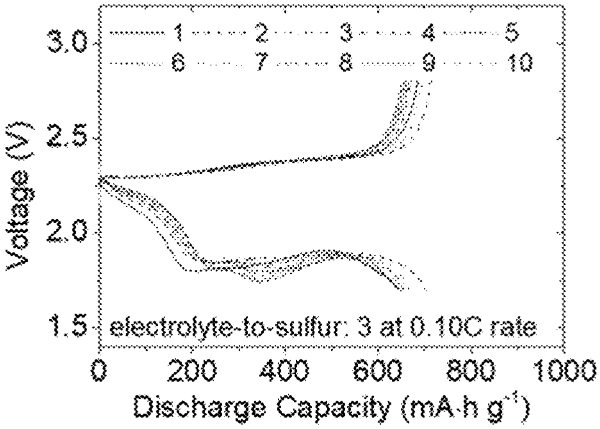
Figure 23A:
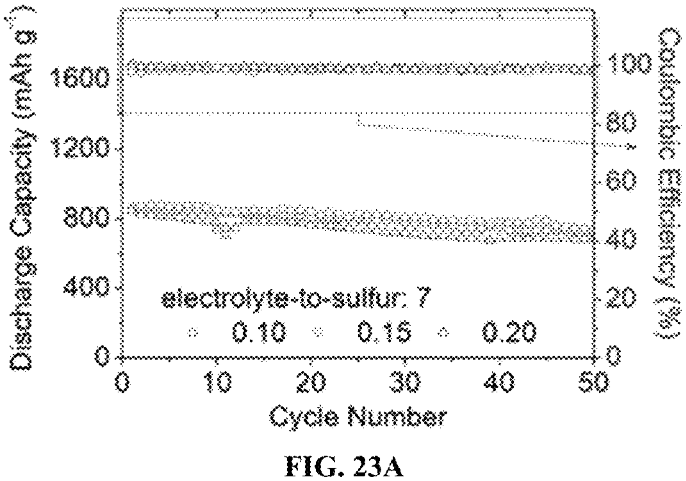
Figure 23B:
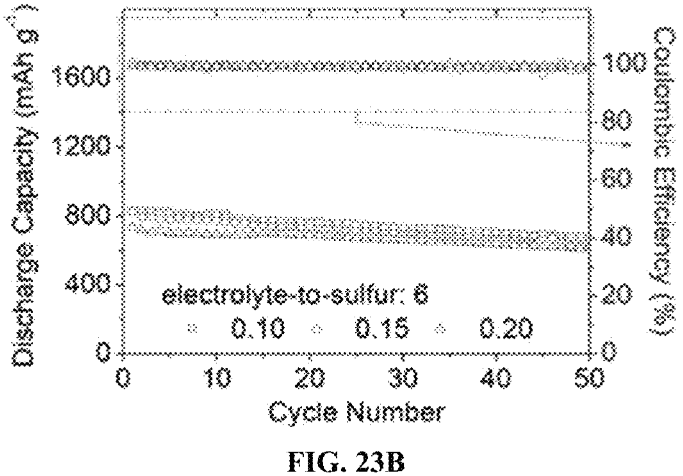
Figure 23C:
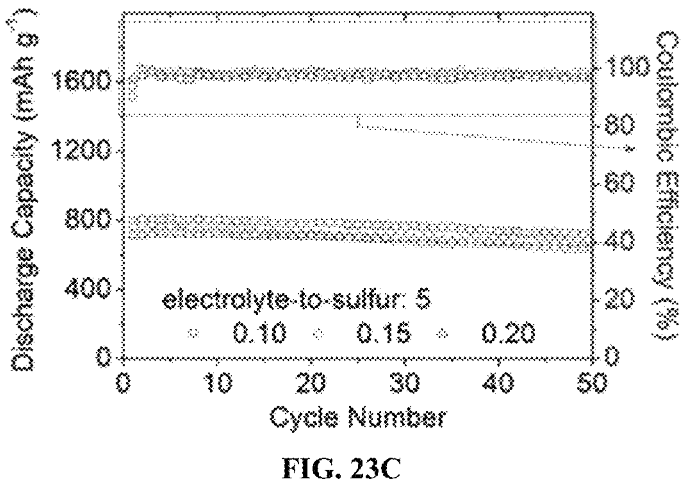
Figure 23D:
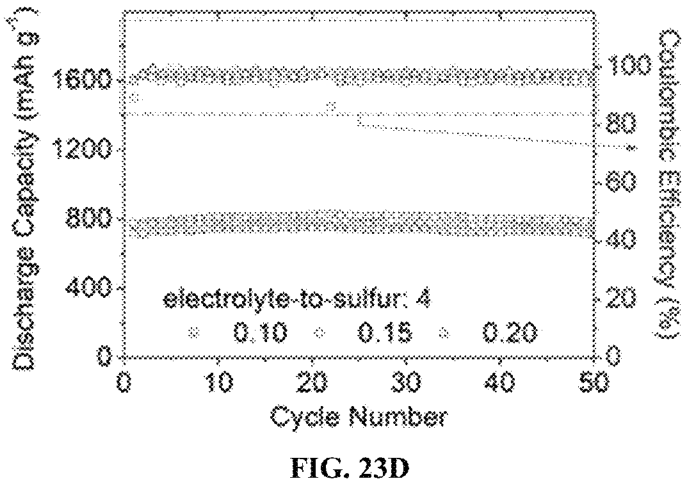

FIG. 22 presents discharge/charge voltage profiles of the lithium-sulfur battery with the core-shell cathode under an electrolyte-to-sulfur ratio of 3 μL/mg at 0.10 C rate for 10 cycles.

FIGS. 23A, 23B, 23C, and 23D present the plots of discharge capacity and coulombic efficiency versus cycle number of the lean-electrolyte lithium-sulfur battery with the core-shell cathode with high sulfur loading under an electrolyte-to-sulfur ratio of 7 μL/mg (FIG. 23A), 6 μL/mg (FIG. 23B), 5 μL/mg (FIG. 23C), and 4 μL/mg (FIG. 23D) at 0.10 C, 0.15 C, and 0.20 C rates, respectively.

Figure 24:
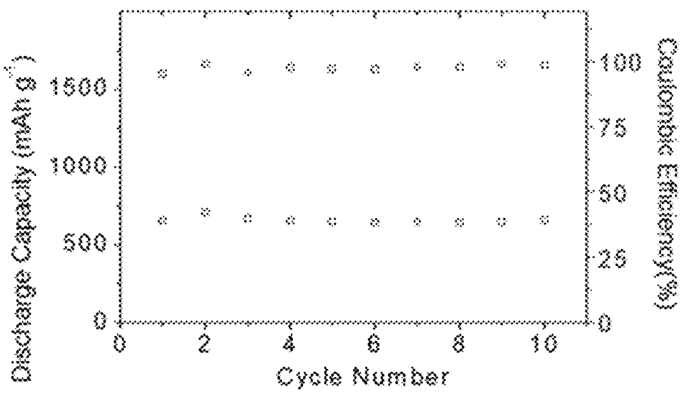

FIG. 24 presents the plot of discharge capacity and coulombic efficiency versus cycle number of the lean-electrolyte lithium-sulfur battery with the core-shell cathode with high sulfur loading under an electrolyte-to-sulfur ratio of 3 μL/mg at 0.10 C rate.

Figure 25:
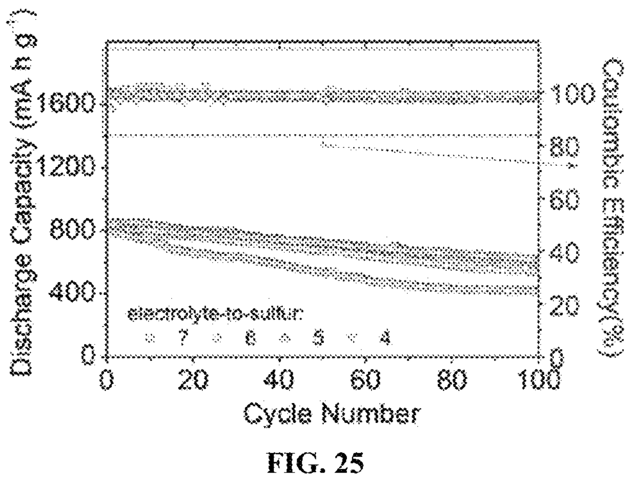

FIG. 25 presents the long-term cyclability analysis of the lean-electrolyte lithium-sulfur battery with the core-shell cathode with high sulfur loading at 0.10 C rate for 100 cycles.

Figure 26A:
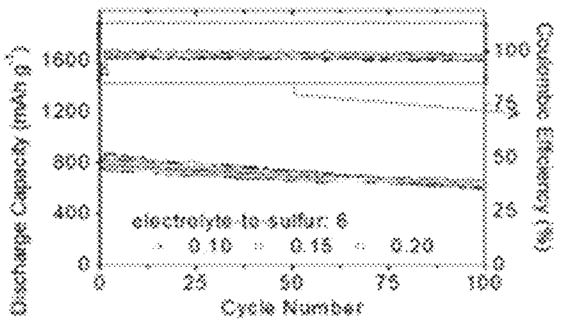
Figure 26B:
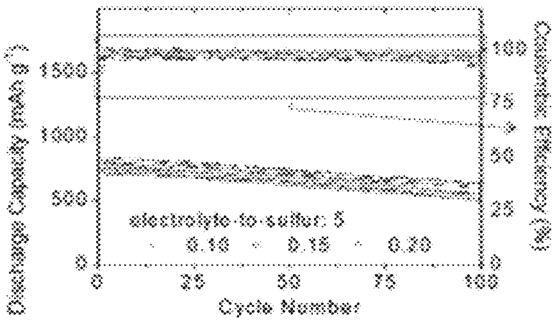
Figure 26C:
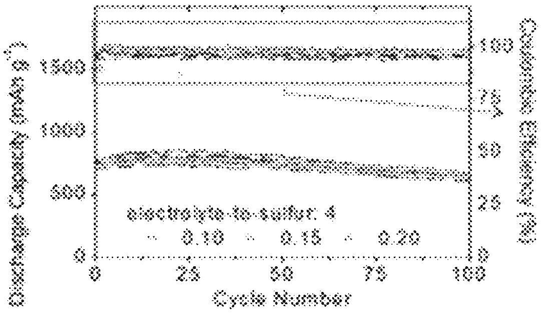
Figure 26D:
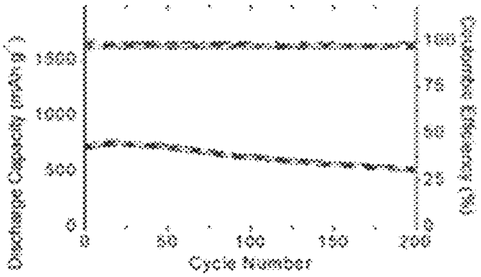

FIGS. 26A, 26B, and 26C presents the long-term cyclability analysis of the lean-electrolyte lithium-sulfur battery with the core-shell cathode with high sulfur loading under an electrolyte-to-sulfur ratio of 6 μL/mg (FIG. 26A), 5 μL/mg (FIG. 26B), and 4 μL/mg (FIG. 26C) at 0.10 C, 0.15 C, and 0.20 C rates, respectively, for 100 cycles. FIG. 26D presents the long-term cyclability analysis under an electrolyte-to-sulfur ratio of 4 μL/mg for 200 cycles.

Figure 27:
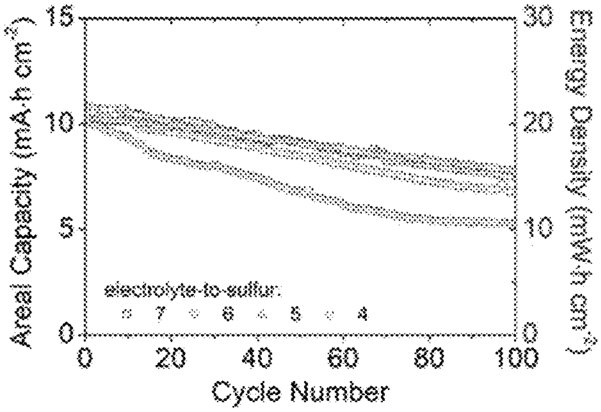

FIG. 27 presents the plot of areal capacity and energy density versus cycle number of the lean-electrolyte lithium-sulfur battery with the core-shell cathode with high sulfur loading at 0.10 C rate.

Figure 28A:
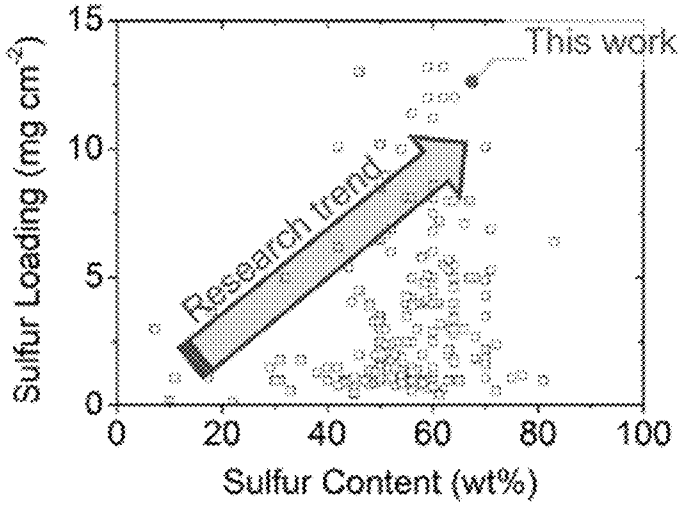
Figure 28B:
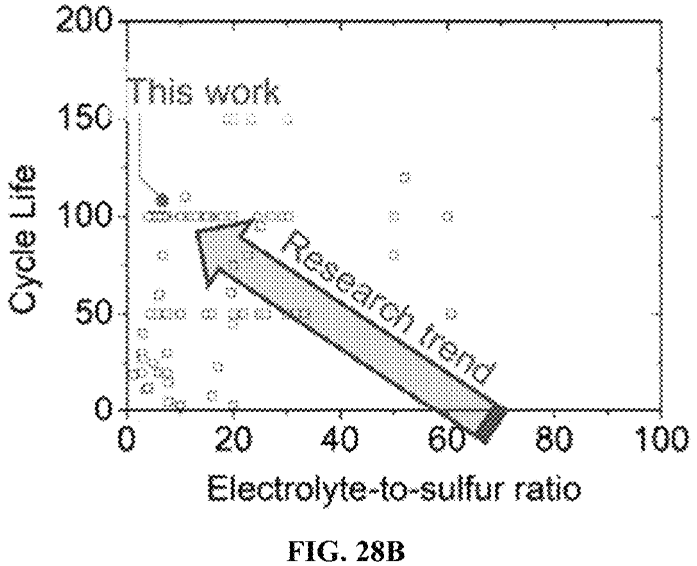
Figure 28C:
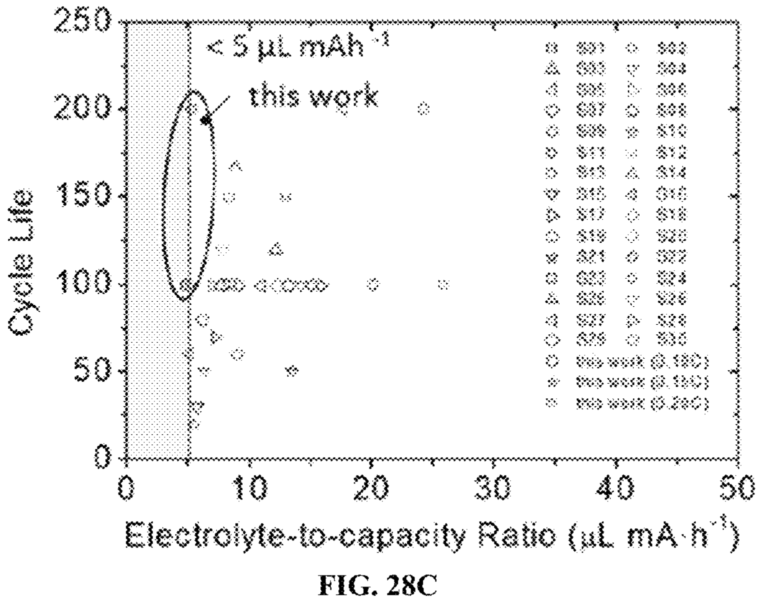

FIGS. 28A, 28B, and 28C present the comparative analysis of various battery assembly parameters and cycling performance. FIG. 28A presents the comparison analysis of sulfur loading and sulfur content. FIG. 28B presents the comparison analysis of cycle life and electrolyte-to-sulfur ratio. FIG. 28C presents the comparison analysis of cycle life and electrolyte-to-capacity ratio.

DETAILED DESCRIPTION

The present invention will be further exemplified by the following examples, which are not to be seen as limiting. The embodiments and description are used for illustrating the details and effect of the present invention.

Fabrication of a Core-Shell Cathode

Figure 1:
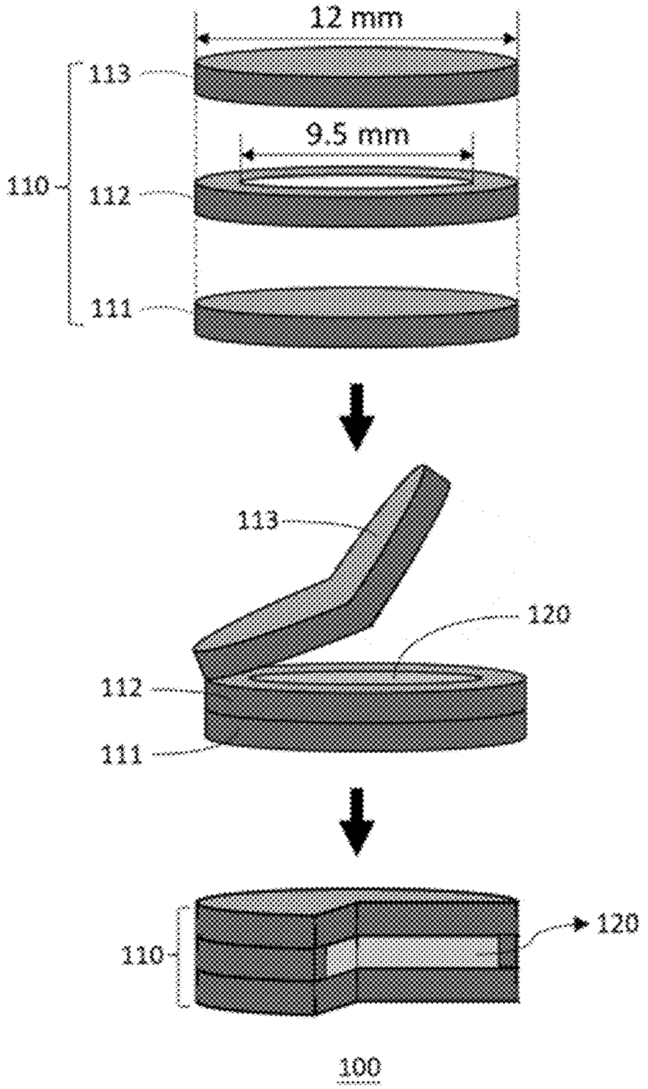
FIG. 1 is a schematic diagram of a core-shell cathode of the present invention.

The structure of a core-shell cathode may be comprised of a modular assembled shell made of highly conductive carbon fiber substrates and a core filled with active materials, polysulfide, within its inner cavity. The material of the shell may include highly conductive carbon fiber substrates or various functional carbon papers. For example, the material of shell 110 may be highly conductive carbon fiber substrates having a weight per unit area of 46 g/cm$^2$. As shown in FIG. 1, said materials are cut into a first layer 111 and a second layer 113 which are both 12 mm in diameter, and an O-ring 112 which is 12 mm in outer diameter and 9.5 mm in inner diameter. Then, the first layer 111, O-ring 112, and second layer 113 are sequentially stacked from bottom to top, and thus the cavity core 120 is formed inside to accommodate active materials and function as a current collector simultaneously, which forms a core-shell cathode 100. The core-shell cathode of the present invention does not require additional binders.

The active material filled within the core 120 is formed from liquid polysulfides as the initial reactants. The polysulfide catholyte is a composite of lithium sulfide (99+%, Alfa Aesar) and sulfur (99.5%, Alfa Aesar), both served as precursors; then filled into the core 120 and thus the fabrication of a core-shell cathode is completed.

The synthesis method of catholyte containing liquid polysulfides:

The polysulfide catholyte ($Li_2S_6$, 1.5M) is a mixture of liquid-state polysulfides and organic electrolytes. The synthesis reaction, $Li_2S+5S \rightarrow Li_2S_6$, forms the long-chain polysulfide, $Li_2S_6$, as an intermediate in a multistep reaction while forming a sulfur cathode. Firstly, weigh two types of precursors, 0.276 g of lithium sulfide ($Li_2S$) and 0.960 g of sulfur (S) in a mole ratio of 1:5; after that, weigh two types of electrolyte salts, 2.124 g of lithium salt (lithium bis (trifluoromethanesulfonyl)imide, LiTFSI, 1.85M) and 0.140 g of lithium nitrate ($LiNO_3$, 0.5M) co-salt. Then, these four types of powder are thoroughly mixed in a 20 ml glass scintillation vial with a magnetic stirrer. Subsequently, two types of electrolyte solvents, 2 ml of 1,3-dioxacyclopentane (DOL, $C_3H_6O_2$) and 2 ml of 1,2-dimethoxyethane (DME, $C_4H_{10}O_2$), are added into the glass scintillation vial in a volume ratio of 1:1, and stir at a speed of 360 rpm at 84° C. for approximately 6 hours to form a gray-orange solution, and then stir at a speed of 270 rpm at 82° C. for 36 hours to form a 4 ml red-brown homogeneous solution without precipitate, which is the polysulfide catholyte. The entire manufacturing process is completed in a purified gas glove box filled with argon gas, during which the oxygen and moisture concentrations are constantly maintained under 1 ppm.

The choice of liquid polysulfides as the initial reactant was for the immediate thorough mixing of active materials and electrolytes during the fabrication of catholyte. In addition, liquid-state long-chain polysulfide is soluble in the electrolytes, and thus the reactivity and mobility of active materials are higher than the reactivity and mobility of the final product, solid-state sulfur or lithium sulfide, enabling sufficient utilization of active materials during electrochemical reaction. Moreover, the material structure characteristics of core-shell cathode may efficiently trap the active materials within the cathode to deter diffusion and loss. Thus, a lithium-sulfur battery with a core-shell cathode is equipped with the capacity of functioning high sulfur loading electrode.

The Assembly Method of Catholyte with Active Materials and Core-Shell Cathode

As shown in FIG. 1, the lower two layers of the shell 110, the first layer 111 and the O-ring 112, are stacked sequentially from bottom to top, and 31 μL of the prepared polysulfide catholyte is filled into cavity core 120 area surrounded by O-ring 112, forming a core-shell cathode with a high sulfur loading of 12 mg/cm$^2$ and a high sulfur content of 64 wt %. After that, the uppermost layer, second layer 113, is pressed onto the O-ring 112, and apply pressure on the outer surface of the structure to press fit after assembling. Hence, the fabrication of core-shell cathode 100 is completed.

Preparation of Liquid-State Electrolyte

Weigh two types of electrolyte salt, 5.310 g of lithium salt (LiTFSI, 1.85M) and 0.350 g of lithium nitrate co-salt ($LiNO_3$, 0.5M), and then add the powders into a 20 ml glass scintillation vial. After that, add two types of electrolyte solvent, 5 ml of 1,3-dioxacyclopentane ($C_3H_6O_2$) and 5 ml of 1,2-dimethoxyethane ($C_4H_{10}O_2$) in a volume ratio of 1:1, into the glass scintillation vial, and stir with a magnetic stirrer at room temperature until the solute dissolves entirely. Hence, the preparation of liquid-state electrolyte is completed.

The Assembling Method of Lithium-Sulfur Battery with Core-Shell Cathode

Figure 2:
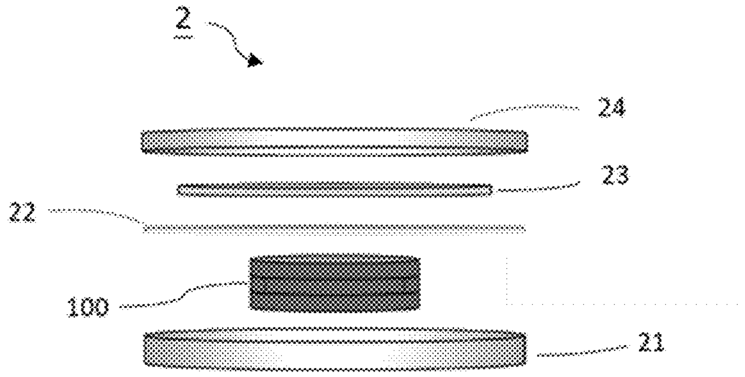
FIG. 2 is a schematic diagram of the assembly of a lithium-sulfur battery with a core-shell cathode of the present invention.

FIG. 2 is an exemplary lithium-sulfur battery 2 of the present invention. The battery components are packaged in a button cell battery, and are stacked from cathode to anode in the following sequence: a battery positive case 21, one set of core-shell cathode 100, specific volume of liquid-state electrolyte (not shown in the figures), one separator 22, specific volume of liquid-state electrolyte (not shown in the figures), one piece of lithium anode 23 as a counter electrode, and a battery negative case 24. After the battery is sealed in a press-fit machine, the assembly is completed. Said separator may be a commercial polypropylene polymeric separator (Celgard), which is cut into a 19 mm disc in diameter, and lithium metal counter electrode is cut into a 14 mm disc in diameter. All packaging procedures are completed in a purified gas glove box filled with argon gas, during which the oxygen and moisture concentration is constantly maintained under 1 ppm.

The electrolyte-to-sulfur ratio (μL/mg) calculation formula of the present invention:

[(the volume of catholyte−sulfur loading)+addition of electrolyte]/sulfur loading=electrolyte-to-sulfur ratio (μL/mg).

Wherein, the volume of catholyte is the volume of the active materials filled within the battery cathode, which contains a specified volume of active materials and electrolytes; sulfur loading is the total weight (mg) of active materials added in the battery.

For example, 31 μL of polysulfide catholyte is filled into the cavity core 120 area surrounded by O-ring 112, and when preparing a core-shell cathode having a sulfur loading of 9 mg, the assembly parameter of the lithium-sulfur battery is fixed in electrolyte-to-sulfur ratio (μL/mg) of 3 μL/mg, 4 μL/mg, 5 μL/mg, 6 μL/mg or 7 μL/mg, which is equivalent to the addition of 5 μL, 14 μL, 23 μL, 32 μL or 41 μL of electrolyte in the battery.

EXAMPLES

In terms of the physiochemical property of materials, the microstructural, morphological and elemental analysis of the materials of core-shell cathode are carried out with the field-emission scanning electron microscope (FE-SEM, JEOL JSM-7001) and the energy-dispersive X-ray spectroscope (EDS) equipped therein.

Example 1: Material Analysis of the Shell of the Core-Shell Cathode

The material of the shell in this example is formed from highly conductive carbon fiber substrates, wherein the pore structure of carbon nanofibers and carbon nanotubes are tested with the Specific Surface Area and Pore Size Distribution Analyzer (Autosorb iQ-MP-MP, Anton Paar), and analyzed with methods by Brunauer-Emmett-Teller (BET), Horvath-Kawazoe (HK), Density Function Theory (DFT), and Barrett-Joyner-Halenda (BJH) to calculate its specific surface area, pore size distribution, total pore volume, and average pore diameter.

Figure 3A:
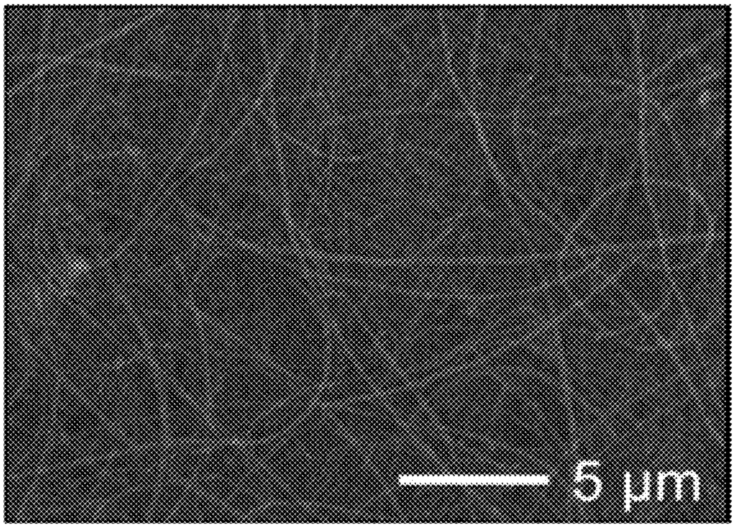
FIG. 3A and FIG. 3B are low and high magnification inspections for microstructural analysis of highly conductive carbon fiber substrates by using an electron microscope.
Figure 3B:
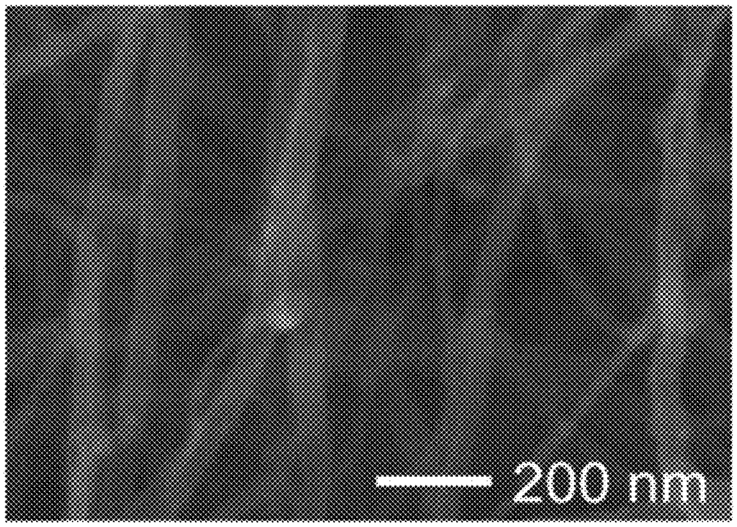

In order to determine whether highly conductive carbon fiber substrate satisfies the needs of being the material of lithium-sulfur battery cathode, this example will analyze it from two physical aspects, microstructure and pore structure. FIGS. 3A and 3B show the microstructure of highly conductive carbon fiber substrate through an electron microscope. The observation result under low magnification on large scale showed that the forming of the highly conductive carbon fiber membrane is a tight net three-dimensional structure with intricately arranged and inextricably intertwined carbon nanofibers and carbon nanotubes; whereas the observation result under high magnification in detail showed that nano-sized spaces remained between the intricately arranged and inextricably intertwined carbon fibers. The application of this carbon fiber physical structure, intertwined but nano-sized space retained in micro-scale, in lithium-sulfur battery cathode will be capable of restraining the diffusion and loss of solid-state and liquid-state active materials, at the same time, undertaking a huge volume change during phase transformations of active materials, simultaneously, acting as the transmission channel for lithium ions, and thus perfecting the contact area of active materials, electrolytes, and conductive substrates. Consequently, the advantage of said structure will be capable of operating a sulfur cathode with high sulfur loading.

Figure 4:
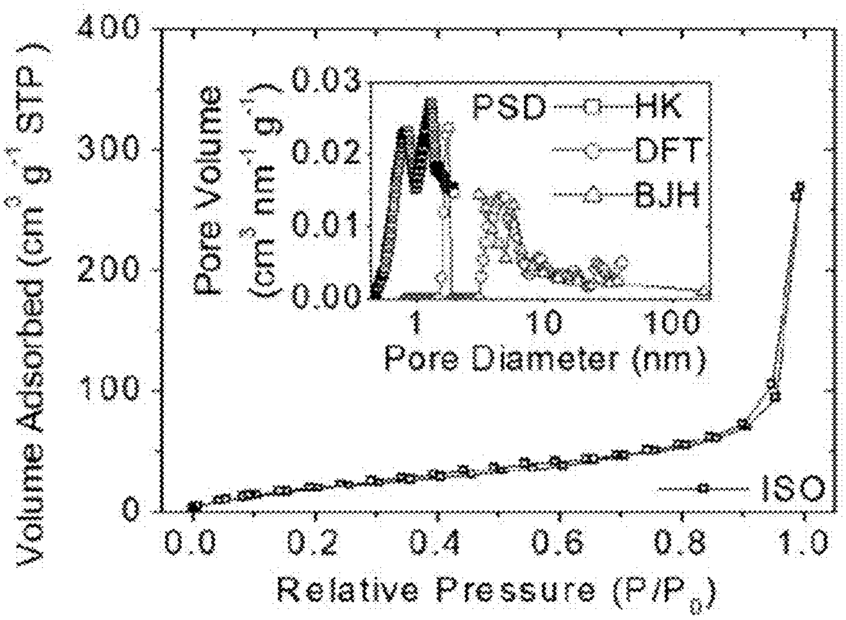
FIG. 4 presents adsorption-desorption isothermal curves and pore-size distribution (embedded diagram) of highly conductive carbon fiber substrates.

The result of examining the pore structure of carbon shell layer using the specific surface area and pore size distribution analyzer is shown in FIG. 4: there is no obvious gas absorption/desorption activity under low and mediate relative pressure, which means carbon fiber substrate contains no obvious detectable micropore, whose diameter is less than 2 nm, or mesopore, whose diameter is between 2 nm to 50 nm; whereas it shows significant gas absorption/desorption activities under high relative pressure, which means the carbon fiber substrate has an amorphous, reticulated, porous structure, whose diameter is greater than 50 nm. Also, the pore volume analysis method by HK, DFT, and BJH is used to analyze pores smaller than 100 nm in diameter, as shown in the embedded diagram in FIG. 4. Based on the calculation of absorption/desorption curve, the specific surface area of carbon fiber substrate is 81.7 m$^2$/g, with a total pore volume of 0.4 cm$^3$/g, and an average pore diameter of 20.4 nm.

To conclude the abovementioned analysis results of microstructure and pores, amorphous macropores come from the nano-sized space between the intertwined carbon fibers, while the average pore diameter is the average result of macropores and a small amount of micro/mesopores. By applying said highly conductive carbon fiber substrate without nanopore in a lithium-sulfur battery cathode, the problem of electrolyte being absorbed by pores so that it cannot be utilized in the electrochemical reaction is avoided, and therefore the electrolytes added in the cathode is utilizable with high efficiency. Hence, when active materials in the core area are effectively enclosed, the objective of lowering the usage of electrolyte is attained as well.

Therefore, in the following examples, a lean-electrolyte battery is set to have assembling parameters of a high sulfur loading of 12 mg/$cm^2$, a high sulfur content of 64.1 wt %, and an electrolyte-to-sulfur ratio between 3 μL/mg and 7 μL/mg to improve the energy density of the system.

Figure 5A:
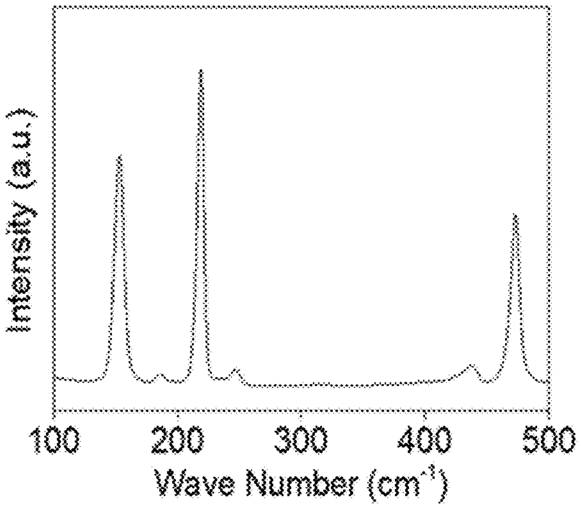
FIGS. 5A, 5B, 5C, and 5D present Raman analysis of a core-shell cathode before cycling.
Figure 5B:
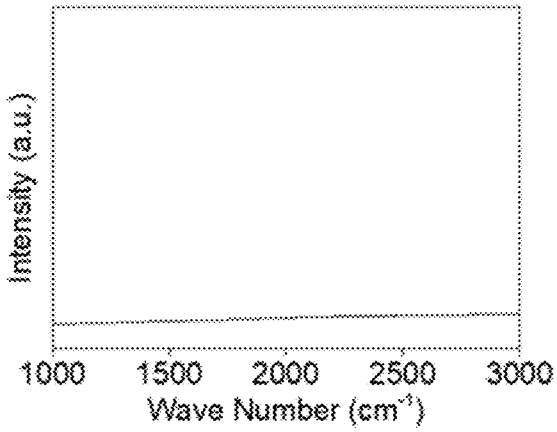
Figure 5C:
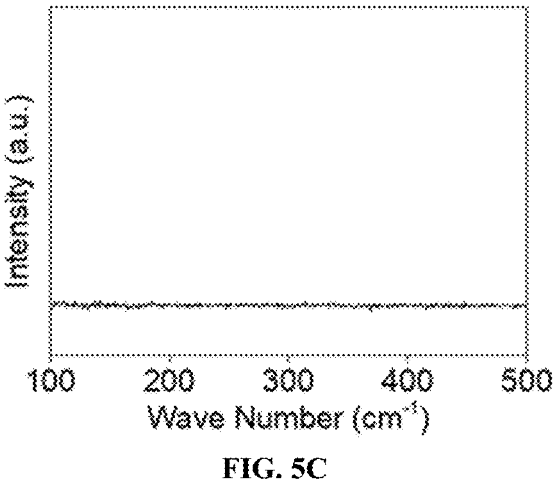
Figure 5D:
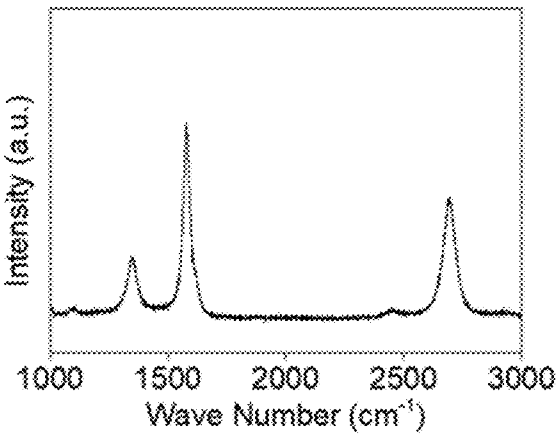
Figure 6A:
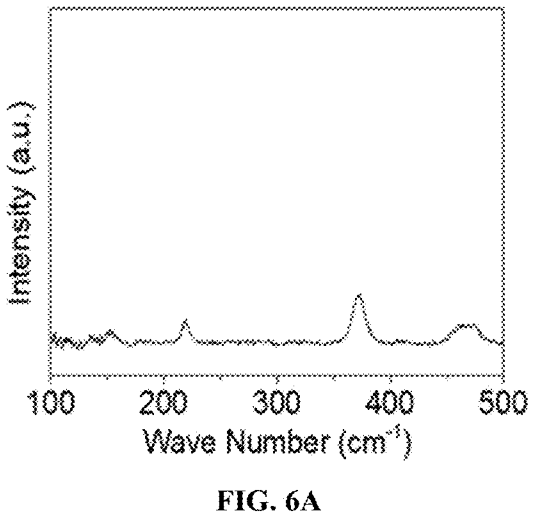
FIGS. 6A, 6B, 6C, and 6D present Raman analysis of a core-shell cathode after cycling.
Figure 6B:
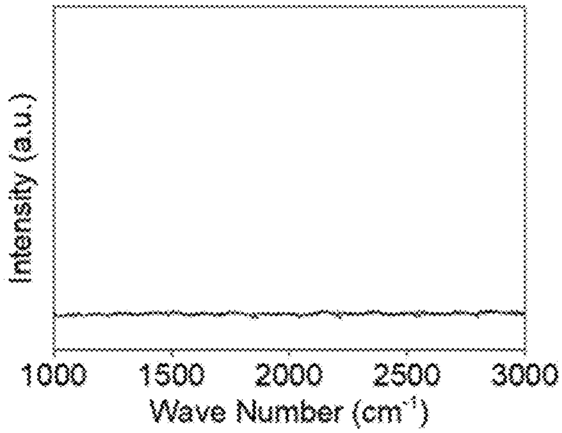
Figure 6C:
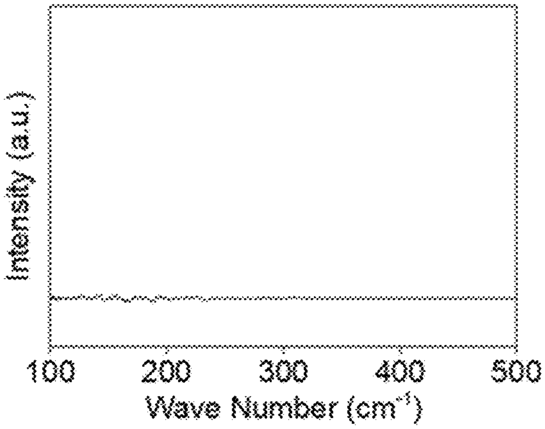
Figure 6D:
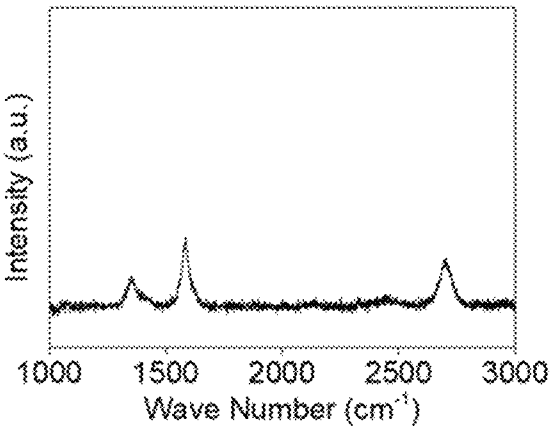

FIGS. 5A, 5B, 5C, and 5D present Raman spectra of the core and the shell of a core-shell cathode before cycling. FIGS. 6A, 6B, 6C, and 6D present Raman spectra of the core and the shell of a core-shell cathode after cycling. As shown in FIG. 5A and FIG. 6A, the core of a core-shell cathode has characteristic peaks of sulfur around 153 $cm^{-1}$, 186 $cm^{-1}$, 219 $cm^{-1}$, 247 $cm^{-1}$, 473 $cm^{-1}$, and 438 $cm^{-1}$, with no characteristic peak of carbon; as shown in FIG. 5D and FIG. 6D, the shell of a core-shell cathode has characteristic peaks of carbon around 1350 $cm^{-1}$, 1578 $cm^{-1}$, 2444 $cm^{-1}$, 2691 $cm^{-1}$, and 2922 $cm^{-1}$, with no characteristic peak of sulfur.

The Raman spectra of the core and the shell of a core-shell cathode before cycling in FIGS. 5A, 5B, 5C, and 5D show that the core contains a strong sulfur signal, while the shell contains a strong carbon signal without sulfur signal, which indicates that active materials are stabilized within the core, without diffusing to or escaping from the shell. As shown in FIGS. 6A, 6B, 6C, and 6D, the core still contains a strong sulfur signal after cycling, while the shell remains with a strong carbon signal without any sulfur signal, which indicates that after 100 cycles of long-term cycling, active materials did not diffuse out from the shell but remains stable in the core.

Through Raman analysis, the micro-structure and macro-structure of highly tortuous carbon fiber network of a core-shell cathode are proven to be effective in restraining active materials from diffusing, and keeping its high conductivity during cycling.

Figure 7A:
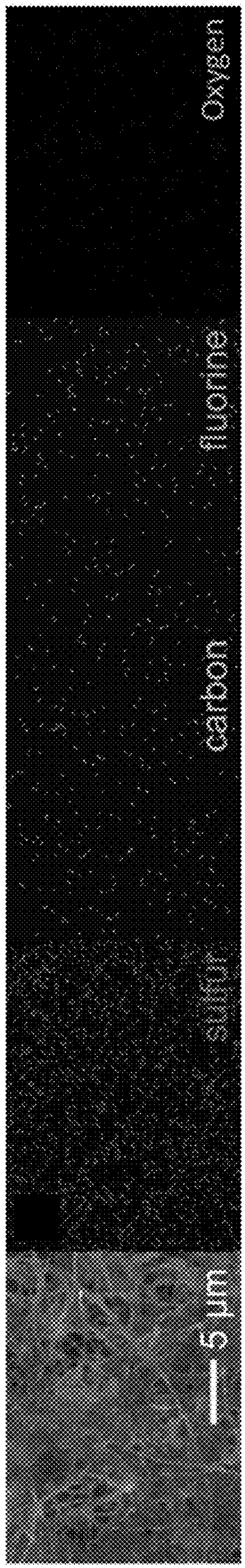
FIGS. 7A and 7B present microstructural and elemental analysis of a core-shell cathode.
Figure 7B:
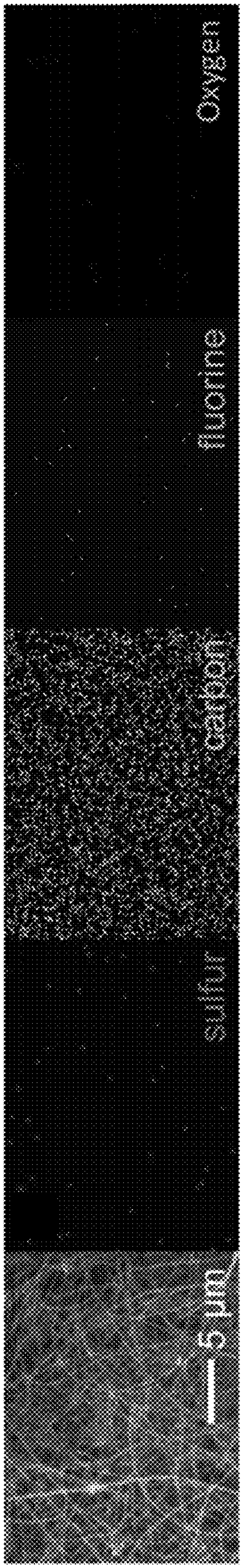

Example 2: Effects Analysis of Core-Shell Cathode Restraining Active Materials from Diffusing As shown in FIGS. 7A and 7B, the core-shell cathode of the present invention effectively restrains active materials from diffusing; in FIG. 7A, the inner surface of the shell shows a strong sulfur signal; in FIG. 7B, the outer surface of the shell shows strong carbon signal and weak sulfur signal.

Figure 8:
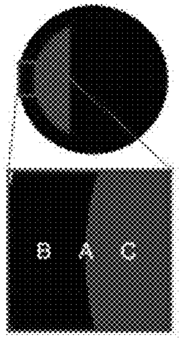
FIG. 8 is a schematic diagram of a core-shell cathode of the present invention and its detailed analysis sites. Site A represents the core-shell interface; Site B represents the shell region near the core-shell interface; Site C represents the core region near the core-shell interface.
Figure 9A:
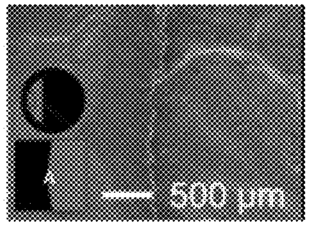
FIGS. 9A, 9B, 9C, 9D, 9E, 9F, 9G, 9H, 9I, 9J, 9K, and 9L present microstructural and elemental analysis of a core-shell cathode before and after cycling.
Figure 9B:
Figure 9C:
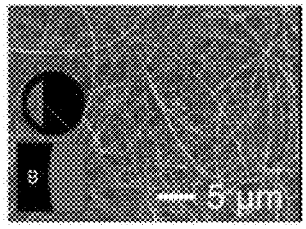
Figure 9D:
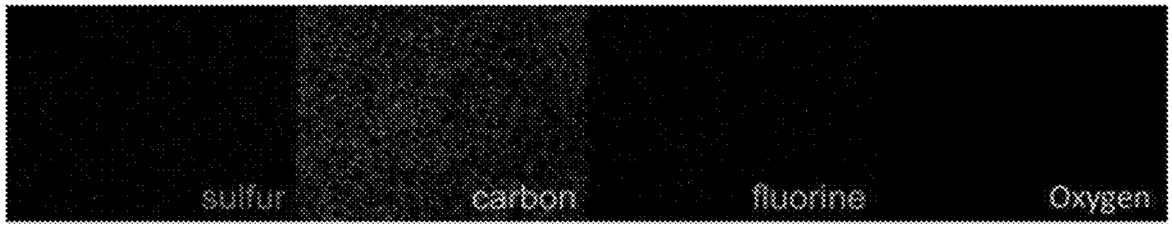
Figure 9E:
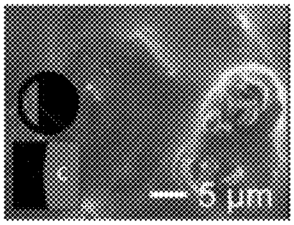
Figure 9F:
Figure 9G:
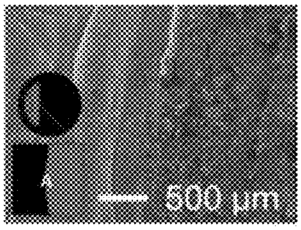
Figure 9H:
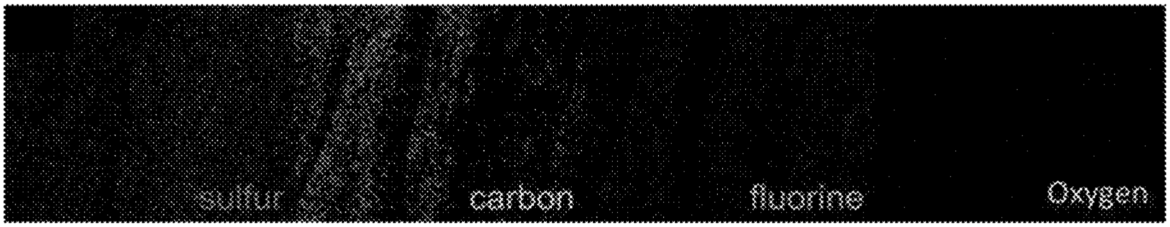
Figure 9I:
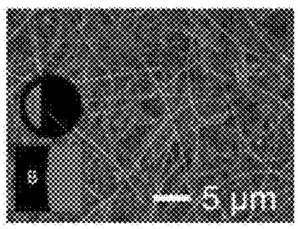
Figure 9J:
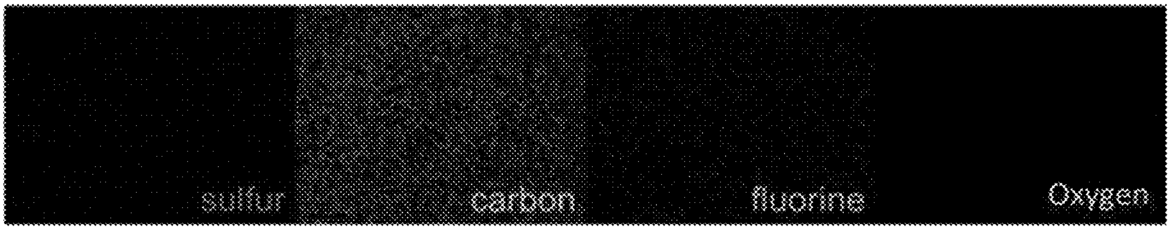
Figure 9K:
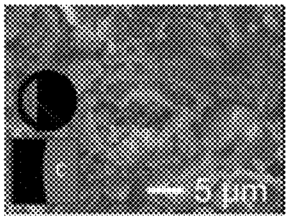
Figure 9L:
Figure 10A:
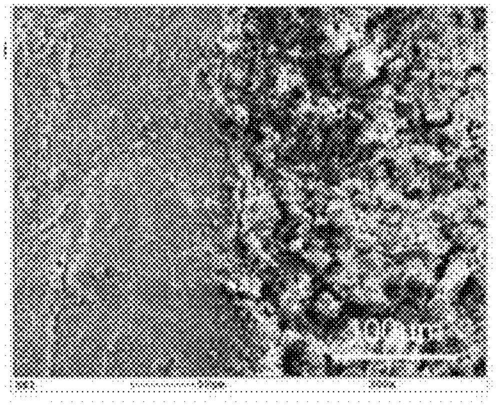
FIGS. 10A, 10B, 10C, 10D, 10E, 10F, 10G, 10H, and 10I present the results for microstructural, elemental, and EDS analysis of a core-shell cathode at Site A (FIGS. 10A, 10B, and 10C), Site B (FIGS. 10D, 10E, and 10F) and Site C (FIGS. 10G, 10H, and 10I) after long-term cycling for 100 cycles.
Figure 10B:
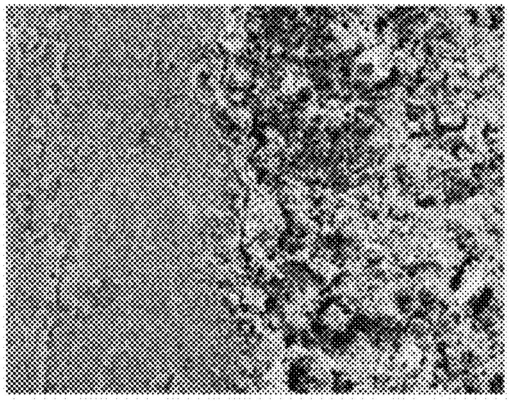
Figure 10C:
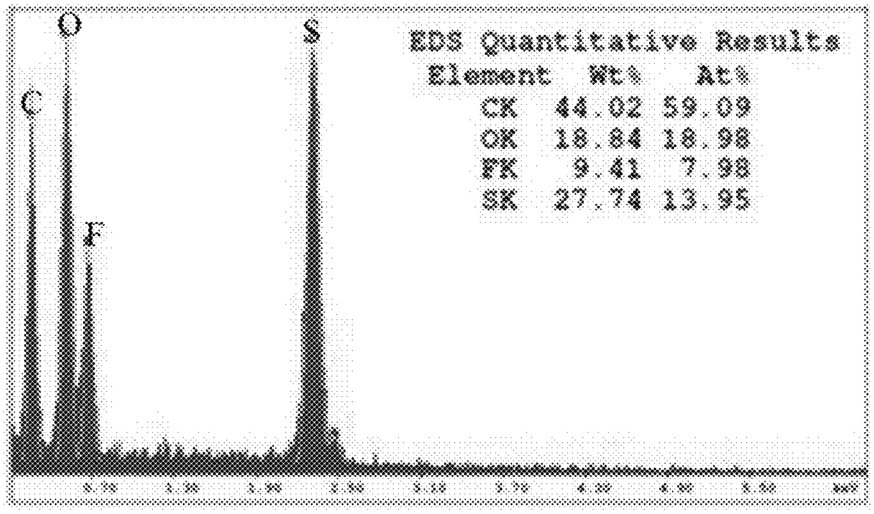
Figure 10D:
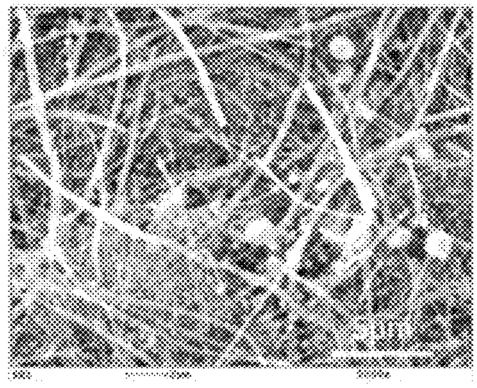
Figure 10E:
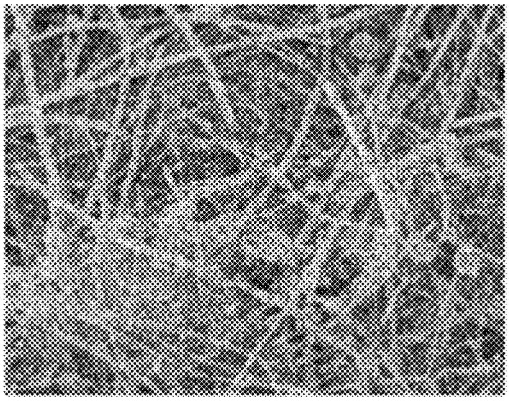
Figure 10F:
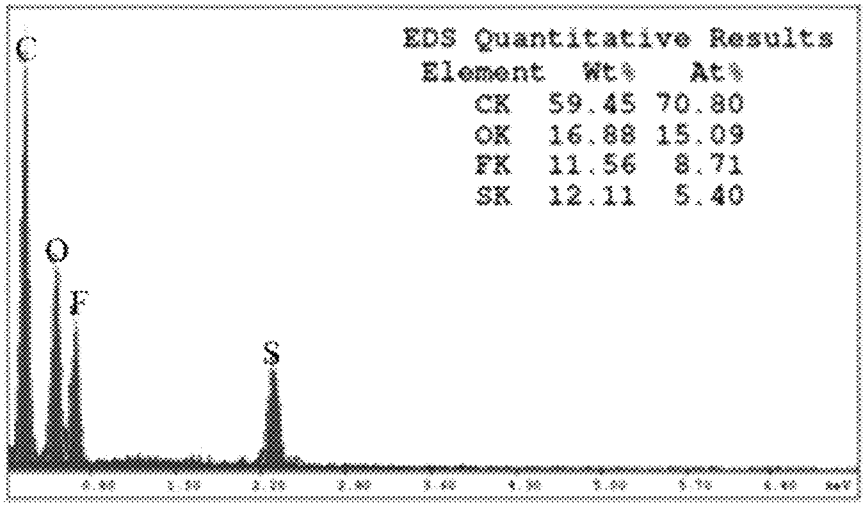
Figure 10G:
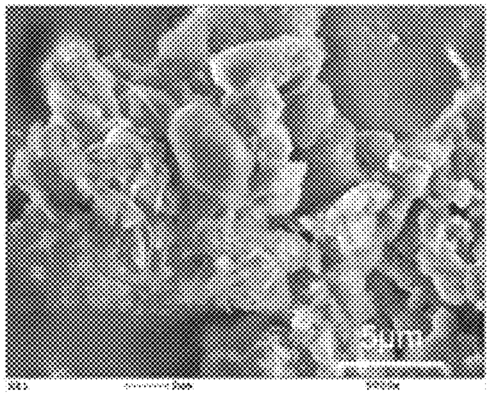
Figure 10H:
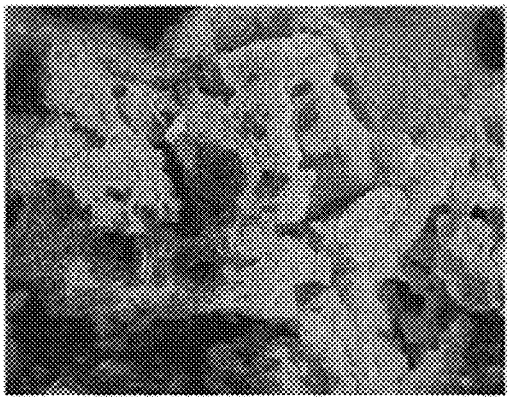
Figure 10I:
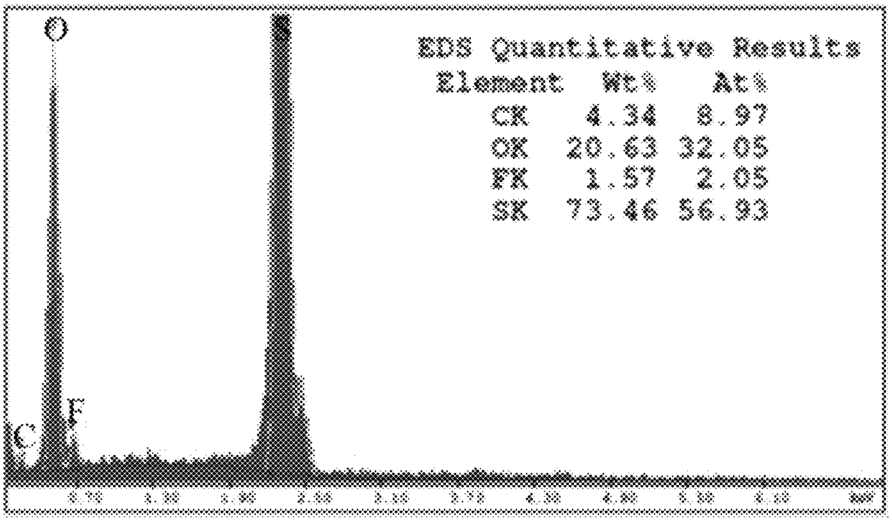

The core-shell cathode is disassembled after long-term cycling. Then, the core is exposed to a detectable level. As shown in FIG. 8, microstructural inspection under low magnification in large-scale and elemental analysis are carried out at Site A (core-shell interface); then, high magnification and detailed inspections are carried out at Site B (shell region) and Site C (core region). Testing results are shown in FIGS. 9A, 9B, 9C, 9D, 9E, 9F, 9G, 9H, 9I, 9J, 9K, and 9L and FIGS. 10A, 10B, 10C, 10D, 10E, 10F, 10G, 10H, and 10I. In FIGS. 9A, 9B, 9C, 9D, 9E, 9F, 9G, 9H, 9I, 9J, 9K, and 9L, the microstructure and elemental analysis of a core-shell cathode before and after cycling are compared; the observation results before the cycling are shown in FIGS. 9A, 9B, 9C, 9D, and 9F, wherein FIGS. 9A and 9B, FIGS. 9C and 9D, FIGS. 9E and 9F respectively represents the microstructures and elemental analysis results of Sites A, B, and C before cycling; while the observation results after cycling is shown in FIGS. 9G, 9H, 9I, 9J, 9K, and 9L, wherein FIGS. 9G and 9H, FIGS. 91 and 9J, FIGS. 9K and 9L respectively represent the microstructural inspections and elemental analysis at Sites A, B, and C after cycling. FIGS. 10A, 10B, 10C, 10D, 10E, 10F, 10G, 10H, and 10I show the microstructural inspections, elemental analysis, and EDS analysis of a core-shell cathode after long-term cycling for 100 cycles, wherein FIGS. 10A, 10B, and 10C, FIGS. 10D, 10E, and 10F, FIGS. 10G, 10H, and 10I respectively represent the observation results at Sites A, B, and C.

The analysis result of Site A (core-shell interface) shows that there is an obvious boundary between the shell on the left and the core on the right, and the carbon signals are mainly distributed among the shell on the left, while the sulfur signals are mainly distributed among the core on the right. At Site B (shell region), carbon fiber structure is highly visible and has a strong carbon signal, and only a few small sulfur particles precipitated and attached to the fiber surface with relatively weak sulfur signals. As for Site C (core region), a large number of sulfur particles precipitated and shows strong sulfur signals, and the carbon fiber structure is covered by a large number of sulfur particles with only weak carbon signals.

The abovementioned analysis results show that the microstructure and macro-design of a core-shell cathode may provide active materials to be effectively kept and evenly precipitated in the core after long-term cycling, which shows the excellent electrochemical reactivity of the shell. In addition, the diffusion of cathode active materials enclosed within the core-shell structure is effectively retrained. Although the diffusion of active materials to the shell is inevitable, said active materials are still effectively utilized within the inner structure of shell. Therefore, lithium-sulfur battery with core-shell cathode remains high capacity retention even after long-term cycling.

Example 3: Electrochemical Analysis

In terms of electrochemistry and properties of the battery, electrochemical impedance spectroscopy (Research-grade potentiostat, SP-150, Bio-Logic) is used to analyze the impact of electrolyte content in a battery system on impedance, with the alternating current frequency range of 1 MHz to 100 MHz, and at an alternating current amplitude of 5 mV. For the cycling performance of a battery with core-shell cathode, battery components are sealed in a button cell battery, and undergo a cycling test with a battery cycler (Programmable Battery Cycler, BCS model, Bio-Logic) at a constant rate of 0.10 C, 0.15 C, or 0.20 C in the voltage window of 1.7 V to 2.8 V. Electrochemical potential of the battery system and the reversibility of redox reaction are analyzed by cyclic voltammetry (galvanostat system, VMP3, Bio-Logic) at scanning rates from 0.01 mV/s to 0.05 mV/s in the voltage window of 1.7 V to 2.8 V.

Figure 11A:
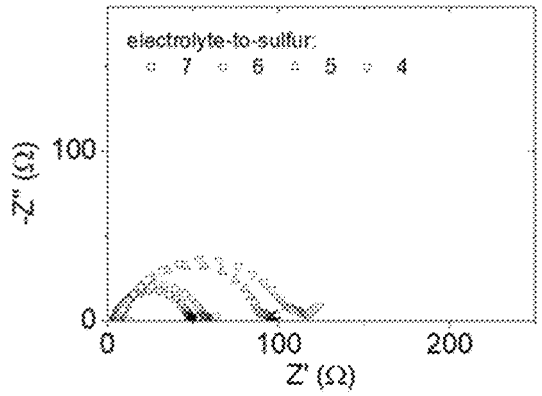
FIGS. 11A and 11B present electrochemical impedance analysis of the core-shell cathode with high sulfur loading before (FIG. 11A) and after (FIG. 11B) cycling in the lean-electrolyte lithium-sulfur battery with electrolyte-to-sulfur ratios of 4 to 7 μL/mg.
Figure 11B:
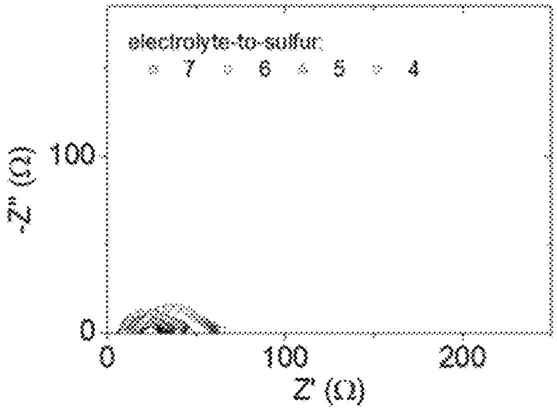
Figure 12A:
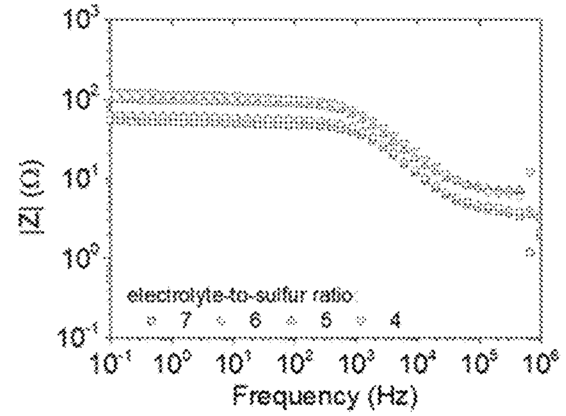
FIGS. 12A, 12B, 12C, and 12D present the Bode plots of the core-shell cathode before (FIGS. 12A and 12B) and after (FIGS. 12C and 12D) cycling in the lean-electrolyte lithium-sulfur battery.
Figure 12B:
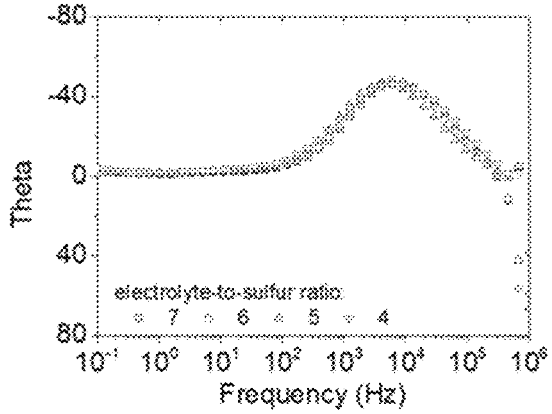
Figure 12C:
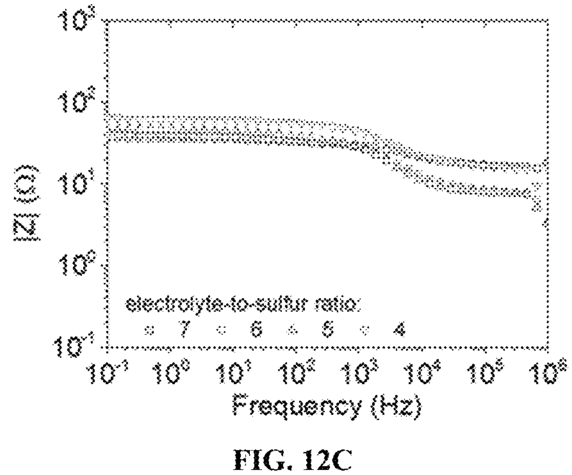
Figure 12D:
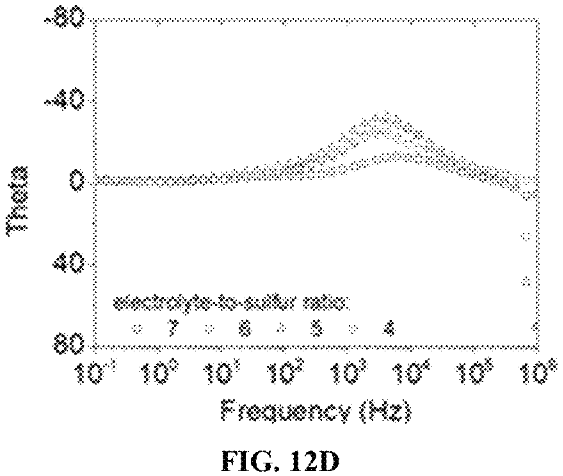

To test the impact of different electrolyte content on battery impedance performance, a lean-electrolyte lithium-sulfur battery with a core-shell cathode undergoes electrochemical impedance analysis before and after cycling. As shown in FIGS. 11A and 11B, the x-intercept in the high-frequency range represents the ohmic resistance of a battery, whose value is related to the components or viscosity of the electrolytes; whereas the half-arc diameter in full frequency range represents charge transfer resistance between the core and shell of the battery cathode, whose value is viable to analyze electrochemical reaction kinetics of battery. The result of the analysis is shown in FIG. 11A. When the electrolyte-to-sulfur ratio is at 4 μL/mg to 7 μL/mg, its ohmic resistance is at 3Ω to 7Ω, and charge transfer resistance is at 48Ω to 105Ω. Although ohmic resistance and charge transfer resistance are slightly increased due to decreased electrolyte-to-sulfur ratio, the low impedance value from the analysis shows that lean-electrolyte lithium-sulfur battery with core-shell cathode remains highly conductive with electrons and lithium ions. FIGS. 12A, 12B, 12C, and 12D show the Bode plots of lean-electrolyte lithium-sulfur battery before and after cycling in an electrolyte-to-sulfur ratio of 4 μL/mg to 7 μL/mg.

Figure 13A:
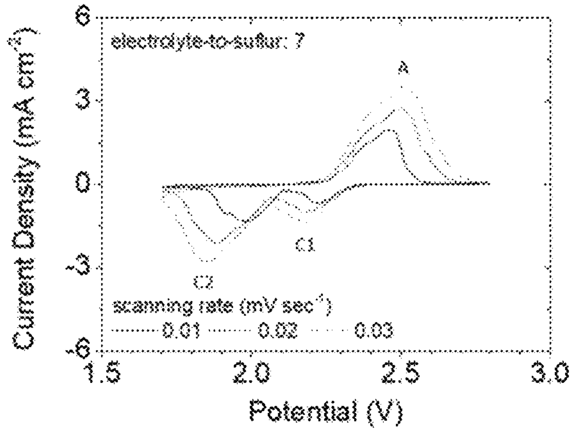
FIGS. 13A, 13B, 13C, and 13D present rate-dependent cyclic voltammetry analysis of the core-shell cathode with high sulfur loading in the lean-electrolyte lithium-sulfur battery with electrolyte-to-sulfur ratios of 7 μL/mg (FIG. 13A), 6 μL/mg (FIG. 13B), 5 μL/mg (FIG. 13C), and 4 μL/mg (FIG. 13D).
Figure 13B:
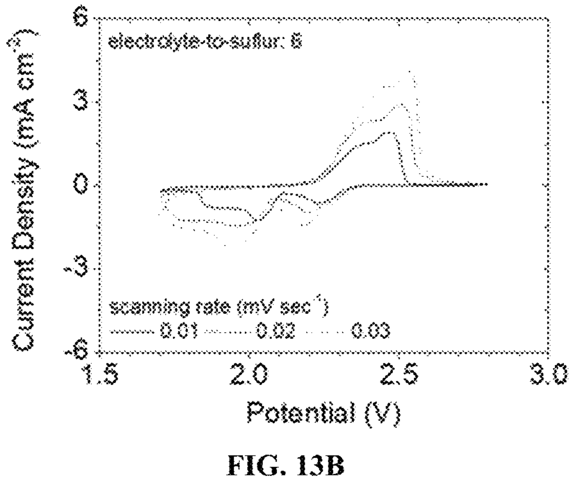
Figure 13C:
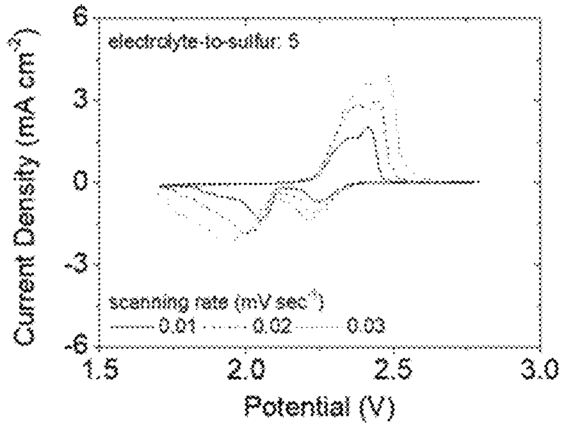
Figure 13D:
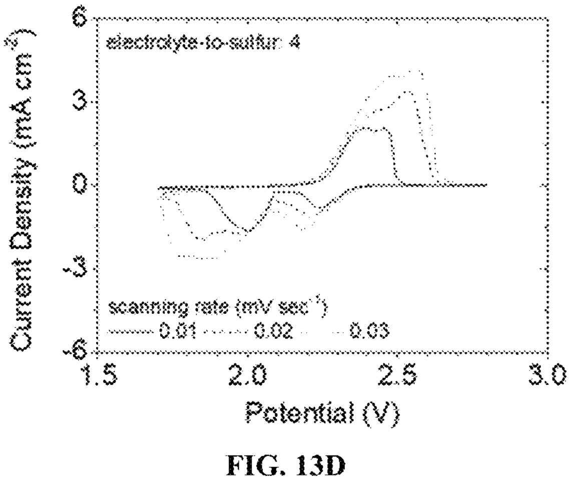
Figure 14A:
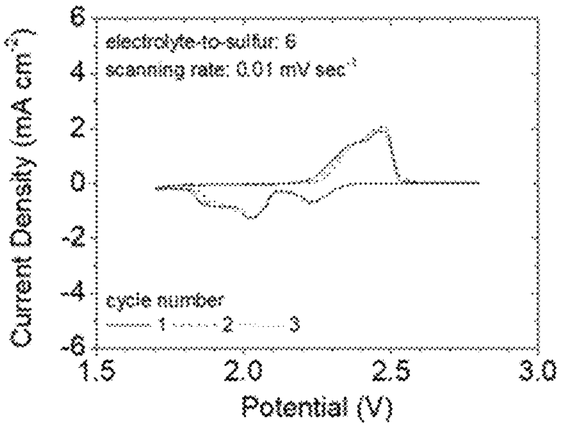
FIGS. 14A, 14B, and 14C present cyclic voltammograms of the lithium-sulfur battery with the core-shell cathode under an electrolyte-to-sulfur ratio of 6 μL/mg at a scanning rate of 0.01 mV/s (FIG. 14A), 0.02 mV/s (FIG. 14B), and 0.03 mV/s (FIG. 14C).
Figure 14B:
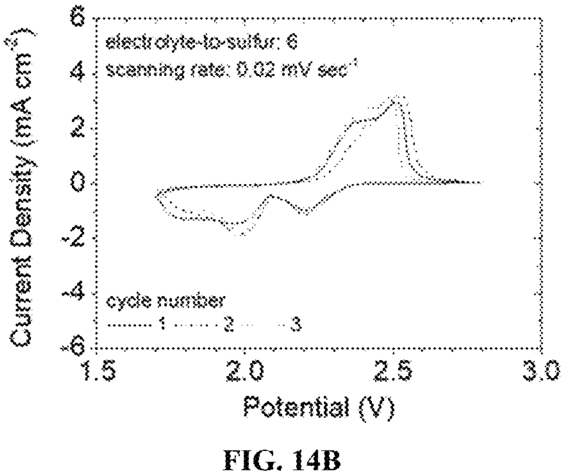
Figure 14C:
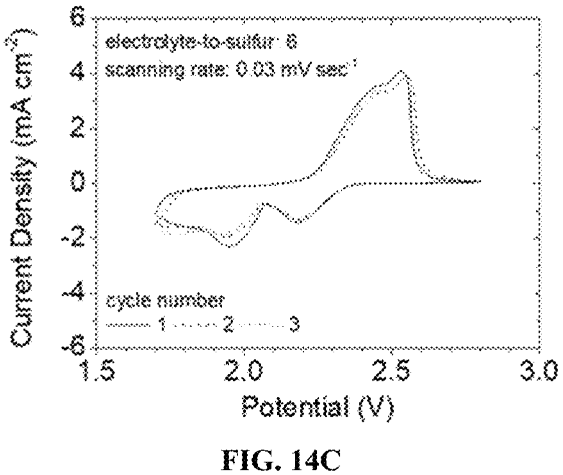
Figure 15A:
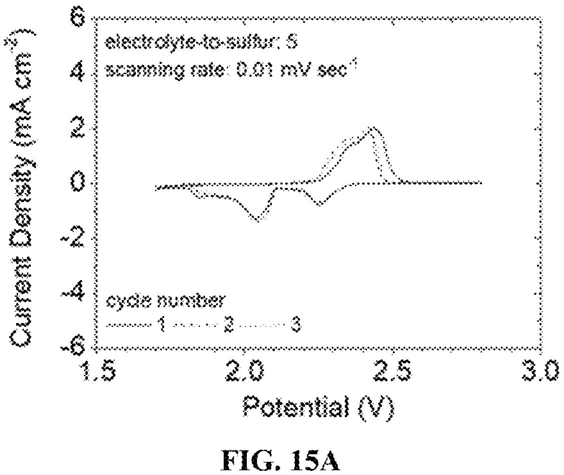
FIGS. 15A, 15B, and 15C present cyclic voltammograms of the lithium-sulfur battery with the core-shell cathode under an electrolyte-to-sulfur ratio of 5 μL/mg at a scanning rate of 0.01 mV/s (FIG. 15A), 0.02 mV/s (FIG. 15B), and 0.03 mV/s (FIG. 15C).
Figure 15B:
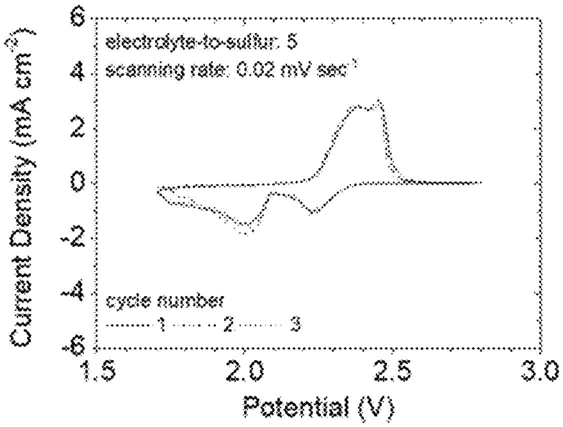
Figure 15C:
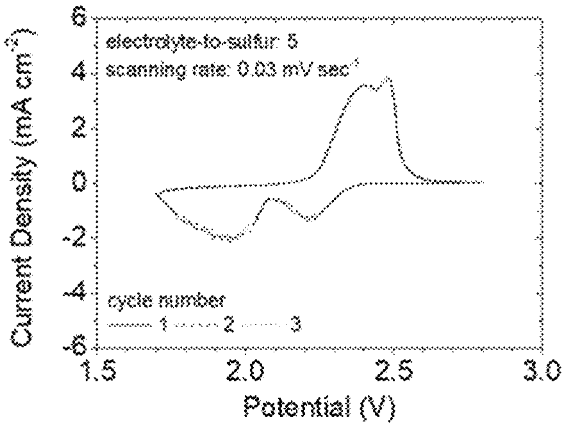
Figure 16A:
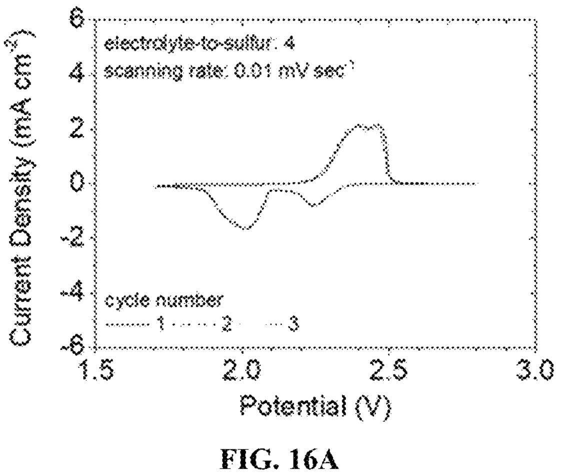
FIGS. 16A, 16B, and 16C present cyclic voltammograms of the lithium-sulfur battery with the core-shell cathode under an electrolyte-to-sulfur ratio of 4 μL/mg at a scanning rate of 0.01 mV/s (FIG. 16A), 0.02 mV/s (FIG. 16B), and 0.03 mV/s (FIG. 16C).
Figure 16B:
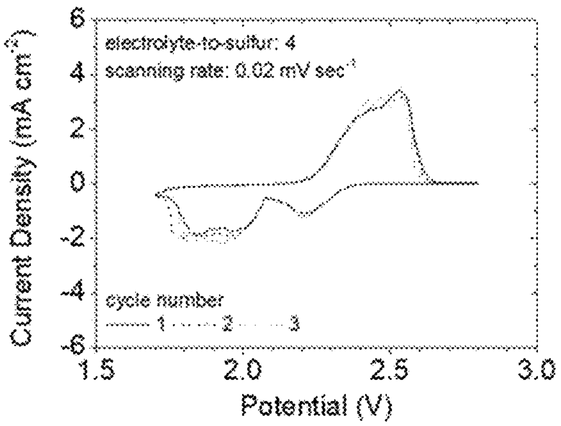
Figure 16C:
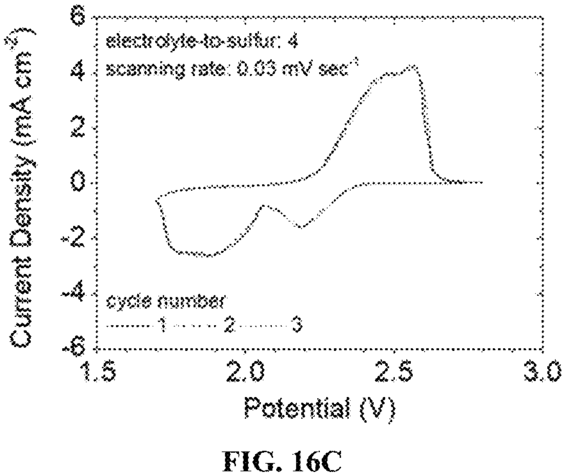

To further test and analyze the diffusion capacity of lithium ions, the cyclic voltammograms under an electrolyte-to-sulfur ratio of 4 μL/mg to 7 μL/mg are presented in FIGS. 13A, 13B, 13C and 13D, FIGS. 14A, 14B and 14C, FIGS. 15A, 15B, and 15C, and FIGS. 16A, 16B and 16C, wherein the battery is charged from open-circuit voltage to 3.0 V and then scanned in the voltage window of 1.7 V to 2.8 V. As shown in FIG. 13A, under an electrolyte-to-sulfur ratio of 7 μL/mg, the curve shows a reduction peak C1 at 2.2 V and a reduction peak C2 at 2.0 V, respectively corresponding to the following two steps of discharge reaction: reduction peak C1 corresponding to the reduction of sulfur in the cathode to long-chain polysulfide $Li_2S_x$ ($4 \le x \le 8$), and reduction peak C2 corresponding to the reduction of long-chain polysulfide to lithium sulfide (i.e. reduction peak C1: $S \rightarrow Li_2S_{4\text{-}8}$, and reduction peak C2: $Li_2S_{4\text{-}8} \rightarrow Li_2S_2/Li_2S$); while the two overlapping oxidation peaks A at 2.3V to 2.4 V correspond to a consecutive two-stage charge reaction, which is the oxidation of lithium sulfide to sulfur (i.e. $Li_2S_2/Li_2S \rightarrow Li_2S_{4\text{-}8}$ and $Li_2S_{4\text{-}8}Li_2S_8/S$). At different scanning rates between 0.01 mV/s and 0.03 mV/s, all the curves show clear redox peaks, and the polarization level increases with the increases of scanning rate, since only with more energy will an adequate amount of lithium ions diffuse to satisfy the needs of redox reactions. After calculation, the reduction peaks C1 and C2, and oxidation peak A respectively has a lithium-ion diffusion coefficient of $1.0\times10^{-7}$, $3.1\times10^{-7}$, and $7.9\times10^{-7}$ $cm^2/s$, which are superior to commercial lithium-ion battery, confirming that the spaces between intertwined carbon fiber structure of the core-shell cathode material are viable to act as high-efficiency transmission channels for lithium ions.

FIGS. 17A, 17B, 17C, and 17D show the lithium-ion diffusion coefficient under the electrolyte-to-sulfur ratios of 4 μL/mg to 7 μL/mg. The reduction peak C1 corresponds to the reduction reaction of sulfur to polysulfide (i.e. $S \rightarrow Li_2S_{4\text{-}8}$), and the reduction peak C2 corresponds to the solid-state precipitation reaction of the reduction of long-chain polysulfide to lithium sulfide (i.e. $Li_2S_{4\text{-}8} \rightarrow Li_2S_8/S$). The oxidation peaks A1 and A2 represent the continuous charging reaction of the oxidation of solid-state lithium sulfide to long-chain polysulfide and sulfur (i.e. $Li_2S_2/Li_2S \rightarrow Li_2S_{4\text{-}8}$ and $Li_2S_{4\text{-}8} \rightarrow Li_2S_8/S$). High diffusion coefficient indicates the lithium ions have stable diffusion capability in the core-shell cathode and its high electrochemical utilization.

The abovementioned analyzing results illustrate the excellent electronic and ionic conductivity of a lithium-sulfur battery with the core-shell cathode of the present invention. Then, a long-term cycling test is conducted under different charge/discharge rates at 0.10 C, 0.15 C, and 0.20 C rates. The electrochemical reactivity is analyzed by charge/discharge voltage profiles of the lithium-sulfur battery under electrolyte-to-sulfur ratios between 3 μL/mg and 7 μL/mg as shown in FIG. 18, FIGS. 19A, 19B and 19C, FIGS. 20A, 20B and 20C, FIGS. 21A, 21B and 21C, and FIG. 22. The upper discharge plateau at 2.25V corresponding to reduction peak C1 in cyclic voltammogram (as shown in FIG. 13A) is the reaction of reduction of sulfur to long-chain polysulfide. The highly overlapping upper discharge plateau indicates high reactivity and reversibility of phase transformation in the reduction reaction at this stage, which shows lowering electrolyte-to-sulfur ratio does not affect its excellent electrochemical reactivity capacity. The lower discharge plateau at 2.00V corresponding to C2 reduction peak in cyclic voltammogram is the solid-state precipitation reaction of the reduction of long-chain polysulfide to lithium sulfide. The highly overlapping and stable lower discharge plateau indicates the reaction kinetics and diffusion efficiency of lithium ions are not hindered in lean-electrolyte environment. The continuous upper and lower charge plateaus at about 2.25V to 2.40 V corresponding to the continuous oxidation peaks A in cyclic voltammogram (as shown in FIG. 13A) is the continuous charging oxidation reaction of solid-state lithium sulfide to liquid-state long-chain polysulfide and sulfur. The stable and highly overlapping charge plateau shows the reversibility and stability of charging oxidation reaction.

The abovementioned excellent electrochemical reactivity proves that the highly conductive carbon substrate shell of a core-shell cathode can effectively make up for the disadvantage of the low conductivity of solid-state active materials, and also effectively restrain the diffusion of liquid-state long-chain polysulfide easily dissolved in electrolytes to slow down the irreversible loss in active materials. Also, highly conductive carbon substrate shell without micropores does not absorb electrolytes so the electrolytes can be effectively utilized, and the spaces between intertwined fibers of said shell restrain the diffusion of active materials and simultaneously provide transmission channel for lithium ions. According to above excellent electrochemical properties, a core-shell cathode enables a high sulfur loading electrode and lean-electrolyte lithium-sulfur battery to approach a highly efficient electrochemical reaction and 100 cycles of stable and reversible charge/discharge cycle.

Example 4: Battery Performance Testing of Lithium-Sulfur Battery with Core-Shell Cathode Electrochemical analysis proves that the core-shell cathode of the present invention has high electronic and ionic conductivity. In this example, the rate capacity of a battery is further tested at different charge-discharge rates of 0.10 C, 0.15 C, and 0.20 C. FIGS. 23A, 23B, 23C, and 23D show the performance data of lithium-sulfur battery under electrolyte-to-sulfur ratios between 4 μL/mg to 7 μL/mg at different rates. FIG. 24 shows the performance data of lithium-sulfur battery with an electrolyte-to-sulfur ratio of 3 μL/mg. Peak discharge capacity reaches 847 to 858 mAh/g under an electrolyte-to-sulfur ratio of 7 μL/mg; peak discharge capacity reaches 732 to 834 mAh/g under an electrolyte-to-sulfur ratio of 6 μL/mg; peak discharge capacity reaches 723 to 809 mAh/g under an electrolyte-to-sulfur ratio of 5 μL/mg; peak discharge capacity reaches 756 to 826 mAh/g under an electrolyte-to-sulfur ratio of 4 μL/mg; peak discharge capacity reaches about 703 mAh/g under an electrolyte-to-sulfur ratio of 3 μL/mg. In addition, a high coulombic efficiency of 98% is reached during the cycle.

After stable and reversible cycling for 50 cycles at different rates, discharge capacity retains at 686 to 723 mAh/g under an electrolyte-to-sulfur ratio of 7 μL/mg; discharge capacity retains at 619 to 675 mAh/g under an electrolyte-to-sulfur ratio of 6 μL/mg; discharge capacity retains at 666 to 722 mAh/g under an electrolyte-to-sulfur ratio of 5 μL/mg; discharge capacity retains at 713 to 782 mAh/g under an electrolyte-to-sulfur ratio of 4 μL/mg. After stable and reversible cycling for 10 cycles, discharge capacity retains at 655 mAh/g under an electrolyte-to-sulfur ratio of 3 μL/mg. By calculation, the battery performance does not show an obvious decrease due to lowering electrolyte-to-sulfur ratio, but all retain a capacity retention greater than 80%, thus proving the successful fabrication of lean-electrolyte lithium-sulfur battery in the present invention.

Furthermore, considering battery parameters of electrode with high sulfur content reaching a high sulfur loading of 12 mg/cm$^2$ and a high sulfur content of 64.1 wt % at the same time, the density of liquid-state polysulfide dissolved in electrolytes thus increases with the decreases of electrolyte-to-sulfur ratio, which further raises the concentration gradient of polysulfide between cathode and anode and causes the increasing probability of retention capacity loss due to diffusion of active materials out from cathode. Due to the increased density of polysulfide in electrolytes, the viscosity of electrolyte increases at the same time and thus sabotages the stable diffusion of lithium ions, causing decreasing battery system reactivity and active material utilizing capability. Said disadvantage becomes even more severe during cycling under high electronic stream and high ionic stream. However, the properties of high electronic and ionic conductivity of the core-shell cathode of the present invention response to the challenge brought by high active material loading and low electrolyte-to-sulfur ratio in high energy density battery:intertwined fiber structure without micropores provides highly efficient utilizing capability of electrolytes, and also effectively traps active materials within cathode, which proves that lithium-sulfur battery with core-shell cathode still maintains its excellent reactivity, stability, and capacity retention when cycling in a lean-electrolytic environment.

Example 5: Analysis and Comparison of Long-Term Cycling Performances

The long-term cycling stability of the lean-electrolyte lithium-sulfur battery with a high sulfur loading core-shell cathode is shown in FIGS. 25, FIGS. 26A, 26B and 26C, and FIG. 27. In FIG. 25, the lithium-sulfur battery with high sulfur loading core-shell cathode undergoes long-term cyclability test for 100 cycles at a constant rate of 0.10 C under electrolyte-to-sulfur ratios between 4 and 7 μL/mg. In FIGS. 26A, 26B, and 26C, the lithium-sulfur battery with high sulfur loading core-shell cathode undergoes long-term cyclability test for 100 cycles at different charge-discharge rate between 0.10 C and 0.20 C under electrolyte-to-sulfur ratios between 4 and 6 μL/mg, and further undergoes long-term cyclability test for 200 cycles. FIG. 27 indicates the areal capacity and energy density after long-term cycling for 100 cycles at a constant rate of 0.10 C.

As shown in FIG. 25, having a peak discharge capacity of 799 to 858 mAh/g at the beginning of cycling, said battery retains a reversible capacity of 420 to 615 mAh/g after stable cycling for 100 cycles with a high capacity retention of at least 70% by calculation, and also maintains a coulombic efficiency of 98% or higher during cycling. FIG. 26D also indicates a high capacity retention of at least 70% and a high coulombic efficiency of greater than 98% after stable cycling for 200 cycles at a constant rate. Stable and reversible long-term cycling performance once again proves that the core-shell cathode structure provides a lithium-sulfur battery system with outstanding electrochemical reaction kinetics and capacity retention.

To specifically present and to verify the performance advantages and commercial viability of the lithium-sulfur battery with the core-shell cathode of the present invention, battery performance and engineering parameters are compared in the following experiments. In terms of battery performance, as shown in FIG. 27, the areal capacity and energy density are calculated after long-term cyclability test for 100 cycles at a constant rate of 0.10 C. The peak areal capacity of high sulfur loading core-shell cathode reaches 10.1 to 10.8 mAh/cm$^2$ under low electrolyte-to-sulfur ratios between 4 and 7 μL/mg, retaining an areal capacity of up to 5.3 to 7.7 mAh/cm$^2$ even after cycling for 100 cycles. The areal capacity at the beginning and after cycling for 100 cycles are both far superior to commercial batteries for hybrid and electric vehicles, namely, surpassing the areal capacity requirement of 2 to 4 mAh/cm$^2$. Moreover, the peak energy density of the experiment result reaches 20.1 to 21.6 mWh/cm$^2$ by calculation, retaining an energy density of 10.6 to 15.5 mWh/cm$^2$ even after cycling for 100 cycles, which is, along with the performance at the beginning of cycling, superior to commercial lithium cobalt oxide lithium-ion battery with an energy density of around 10.1 mWh/cm$^2$. The abovementioned analysis of battery performances is adequate to show the commercial value of the present invention.

Moreover, in terms of engineering parameters, a high sulfur loading of 12 mg/cm$^2$, a high sulfur content of 64.1 wt %, and a low electrolyte-to-sulfur ratio of 3 to 7 μL/mg are set to reach simultaneously in this example, and a stable long-term cycling for more than 100 cycles is attained under such parameters. The prior art documents and reports are analyzed and organized in FIGS. 28A, 28B, and 28C. The parameters of sulfur loading and sulfur content organized in FIG. 28A are important engineering performance parameter indexes to improve the energy density of batteries. Both parameters in this example satisfy the requirement and surpass the average value in the prior art documents, i.e., a sulfur loading of 1 to 2 mg/cm$^2$, and a sulfur content of 50 to 60 wt %. The parameters of cycle life and electrolyte-to-sulfur ratio are organized in FIG. 28B. The objective of raising energy density can only be attained by lowering the electrolyte-to-sulfur ratio, but the relatively hysteretic reaction kinetics of lean-electrolyte may sacrifice the cycling performance. The electrolyte content in the present invention is set far lower than 20 μL/mg, the average value in the prior art documents, and a stable long-term cycling for 100 cycles is attained, which is superior to the average of 50 cycles under lean-electrolyte conditions. The abovementioned engineering parameters indicate the commercial viability of the present invention and the outstanding battery performances are both proved to be true—the core-shell cathode of the present invention is capable of overcoming the restrictions of the material nature of lithium-sulfur battery during electrochemical reaction through novel electrode structure.

FIG. 28C summarizes the parameters of the cycle life and electrolyte-to-capacity ratio. Electrolyte-to-capacity ratio represents the utilization performance of active material, sulfur, corresponding to the electrolyte. This parameter cannot be directly controlled as an electrolyte-to-sulfur ratio, since electrolyte content significantly affects the utilization of active materials, thereby influencing the battery capacity. Since the electrolyte-to-capacity ratio is related to the weight of inactive materials in a battery and the battery capacity, for a given electrolyte-to-sulfur ratio, the lower the electrolyte-to-capacity ratio, the higher the utilization rate of active material in the battery system, showing a higher specific energy. Prior art review suggests that the electrolyte-to-capacity ratio with commercial value should be lower than 5 μL/mAh. The electrolyte-to-capacity ratio of the lithium-sulfur battery with core-shell cathode in the present invention can be reduced to 4.26 μL/mAh at minimum, and can also attain stable long-term cycling for 100 cycles and 200 cycles.

The core-shell cathode of the present invention may be fabricated based on highly conductive carbon fiber substrates. With its highly tortuous and inextricably intertwined carbon fiber reticulated structure, high active material loading, high capacity retention, long-range charge transport, and low consumption in electrolytes are attained at the same time. Consequently, utilizing the contained large amount of active materials under lean-electrolyte conditions with high efficiency is viable, and thus attaining the stability and highly efficient cyclability of electrode with high sulfur loading in a lean-electrolyte battery. In terms of battery techniques of materials engineering, core-shell sulfur electrode attains a high sulfur loading of 12 mg/cm$^2$ and a high sulfur content of 64.1 wt % simultaneously, achieving it in a lean-electrolyte lithium-sulfur battery by an electrolyte-to-sulfur ratio of merely 3 to 7 μL/mg. Accordingly, each parameter is far superior to the level prior art could reach.

In terms of battery performance of material science, the core-shell electrode high sulfur loading shows excellent rate capacity at 0.10 C, 0.15 C, and 0.20 C rates, charge-discharge reversibility of stable long-term cycling for 100 cycles, and excellent areal capacity and energy density, by up to 10.1 to 10.8 mAh/cm$^2$ and 20.1 to 21.6 mWh/cm$^2$ respectively. Each electrochemical property is also superior to the performances of the prior art, and outperforming the commercial requirements for powering electrical vehicles.

The present invention elevates battery techniques and electrochemical performance entirely, which proves that by applying a novel core-shell cathode structure design in a lithium-sulfur battery system, the material limitation of lithium-sulfur battery can be overcome with improvement of battery performances. Thus, the present invention successfully achieves the commercial goal of a lithium-sulfur battery with high energy density under lean-electrolyte conditions.

100: core-shell cathode
110: shell
111: first layer
112: O-ring
113: second layer
120: core
2: lithium-sulfur battery
21: battery positive case
22: separator
23: lithium anode
24: battery negative case

What is claimed:

1. A lithium-sulfur battery, which is characterized by comprising: a lithium anode, a separator, a core-shell cathode, and an electrolyte;
wherein the core-shell cathode comprises:
a shell, comprising an electrically conductive, porous carbon material; and
a core, which is an inner cavity enclosed within the shell, wherein the core contains an active material and an electrolyte, and the active material comprises liquid polysulfide having the general formula $Li_2S_x$, wherein $4 \leq x \leq 8$;
the shell comprises a first layer, an O-ring and a second layer sequentially stacked from bottom to top to form the inner cavity to contain the active material and the electrolyte; and
the lithium-sulfur battery has an electrolyte-to-sulfur ratio of between 3 μL/mg and 7 μL/mg;
the electrically conductive, porous carbon material has a total pore volume of between 0.3 cm$^3$/g and 0.55 cm$^3$/g, and an average pore diameter of between 10 nm and 40 nm.

2. The lithium-sulfur battery of claim 1, wherein the core-shell cathode has a sulfur loading of at least 5 mg/cm$^2$.

3. The lithium-sulfur battery of claim 1, wherein the core-shell cathode has a sulfur content of at least 60 wt %.

4. The lithium-sulfur battery of claim 1, wherein the electrically conductive, porous carbon material comprises carbon nanofibers and carbon nanotubes, and has a specific surface area of less than 100 m$^2$/g.

5. The lithium-sulfur battery of claim 1, wherein the lithium-sulfur battery has an areal capacity of between 5 mAh/cm$^2$ and 12 mAh/cm$^2$.

6. The lithium-sulfur battery of claim 1, wherein the lithium-sulfur battery has an energy density of between 10 mWh/cm$^2$ and 30 mWh/cm$^2$.

7. The lithium-sulfur battery of claim 1, wherein the lithium-sulfur battery has an electrolyte-to-capacity ratio of less than 5 μL/mAh.

8. The lithium-sulfur battery of claim 1, wherein the lithium-sulfur battery has a capacity retention of at least 70% after cycling for 100 cycles at a c-rate between 0.10 C and 0.20 C.

* * * * *